(12) United States Patent
Mckenzie et al.

(10) Patent No.: US 7,771,596 B2
(45) Date of Patent: Aug. 10, 2010

(54) FILTER CONTAINER, ASSEMBLY AND METHOD FOR MANUFACTURING THE SAME

(75) Inventors: Darrell T. Mckenzie, Gastonia, NC (US); Mark A. Roll, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 0 days.

(21) Appl. No.: 12/337,695

(22) Filed: Dec. 18, 2008

(65) Prior Publication Data

US 2009/0101563 A1    Apr. 23, 2009

Related U.S. Application Data

(63) Continuation-in-part of application No. 11/626,586, filed on Jan. 24, 2007.

(51) Int. Cl.
   *B01D 27/08* (2006.01)
   *B01D 35/30* (2006.01)
(52) U.S. Cl. .................. 210/232; 210/130; 210/443
(58) Field of Classification Search ............ 210/232, 210/130, 443
   See application file for complete search history.

(56) References Cited

U.S. PATENT DOCUMENTS

| | | | |
|---|---|---|---|
| 2,533,266 A | 12/1950 | Kovacs et al. | |
| 2,693,281 A | 11/1954 | Winzen | |
| 3,295,680 A | 1/1967 | Wilber | |
| 3,333,703 A | 8/1967 | Scavuzzo et al. | |
| 3,807,561 A | 4/1974 | Cullis et al. | |
| 4,906,365 A | 3/1990 | Baumann et al. | |
| 5,066,391 A | 11/1991 | Faria | |

(Continued)

FOREIGN PATENT DOCUMENTS

DE    3904701    8/1990

(Continued)

OTHER PUBLICATIONS

Office Action dated Oct. 2, 2009, relating to U.S. Appl. No. 12/337,695.

(Continued)

*Primary Examiner*—Thomas M Lithgow
(74) *Attorney, Agent, or Firm*—Honigman Miller Schwartz and Cohn LLP

(57) ABSTRACT

A filter assembly is disclosed. The filter assembly includes a filter including a filter media, and an end cap; a filter container including an open end, and a wall portion defining a cavity that is adapted to receive the filter, wherein the wall portion includes an inner surface defining the cavity; and a close-out member removably secured to the filter container proximate the open end, wherein the close-out member includes a circumferential wall, an end wall, an inner surface, and an outer surface, wherein the inner surface of the close-out member includes one or more filter-retaining elements that engages the end cap, wherein the one or more filter retaining elements are located proximate one or more of the circumferential wall and the end wall, wherein the one or more filter retaining elements include a radial portion extending radially inwardly from an inner circumferential surface of the circumferential wall, and an axial portion extending axially away from an inner end wall surface of the end wall.

14 Claims, 20 Drawing Sheets

U.S. PATENT DOCUMENTS

| | | | |
|---|---|---|---|
| 5,104,537 A | 4/1992 | Stifelman et al. | |
| 5,342,519 A | 8/1994 | Friedmann et al. | |
| 5,374,355 A | 12/1994 | Habiger et al. | |
| 5,538,626 A | 7/1996 | Baumann et al. | |
| 5,548,893 A | 8/1996 | Koelfgen | |
| 5,556,542 A | 9/1996 | Berman et al. | |
| 5,770,054 A * | 6/1998 | Ardes | 210/130 |
| 5,922,196 A * | 7/1999 | Baumann | 210/232 |
| 6,006,924 A | 12/1999 | Sandford | |
| 6,177,003 B1 | 1/2001 | Jainek et al. | |
| 6,506,303 B1 * | 1/2003 | Gustafsson et al. | 210/248 |
| 6,533,933 B1 | 3/2003 | Stankowski et al. | |
| 6,626,299 B1 | 9/2003 | Brown et al. | |
| 6,635,175 B2 | 10/2003 | Stankowski | |
| 6,752,924 B2 | 6/2004 | Gustafson et al. | |
| 6,830,683 B2 | 12/2004 | Gundrum et al. | |
| RE38,917 E | 12/2005 | Ardes et al. | |
| 7,022,228 B2 | 4/2006 | Hennes et al. | |
| 7,029,575 B1 * | 4/2006 | Baumann et al. | 210/130 |
| 2004/0140255 A1 | 7/2004 | Merritt et al. | |
| 2004/0159600 A1 | 8/2004 | Stankowski | |
| 2004/0182777 A1 | 9/2004 | Stankowski et al. | |
| 2006/0157403 A1 | 7/2006 | Harder et al. | |

FOREIGN PATENT DOCUMENTS

| | | |
|---|---|---|
| DE | 4214500 | 11/1993 |
| DE | 4310234 | 8/1994 |
| EP | 0254776 | 2/1988 |
| GB | 526736 | 9/1940 |
| WO | WO-03020398 | 3/2003 |
| WO | WO-2004033067 | 4/2004 |

OTHER PUBLICATIONS

Office Action dated Oct. 6, 2009 relating to U.S. Appl. No. 11/626,586.

* cited by examiner

FILTER CONTAINER, ASSEMBLY AND METHOD FOR MANUFACTURING THE SAME

RELATED APPLICATION

This application is a continuation-in-part of U.S. patent application Ser. No. 11/626,586 filed on Jan. 24, 2007, the contents of which are fully incorporated herein by reference.

FIELD

The disclosure generally relates to filters and to a filter container, a filter assembly, and a method for manufacturing the same.

BACKGROUND

Known filter assemblies typically include a filter media that is utilized to filter a fluid medium, such as, for example, engine oil, air, or the like for an internal combustion engine. Accordingly, the filter media may substantially remove foreign particulates, contaminates, and the like from the fluid medium to reduce the potential of upsetting or degrading the performance of an internal combustion engine.

Additionally, known filter assemblies typically include a container that houses the filter media. In order to maintain a desired positioning of the filter media in the container, separate filter media retaining components, fasteners, and the like are typically included in a conventional filter assembly.

Although adequate in performing the function of maintaining the filter media in the container, such retaining components, fasteners, and the like can increase the number of parts and assembly time of known filter assemblies.

BRIEF DESCRIPTION OF THE DRAWINGS

The present disclosure will now be described, by way of example, with reference to the accompanying drawings, in which.

DETAILED DESCRIPTION

Figure 1A:
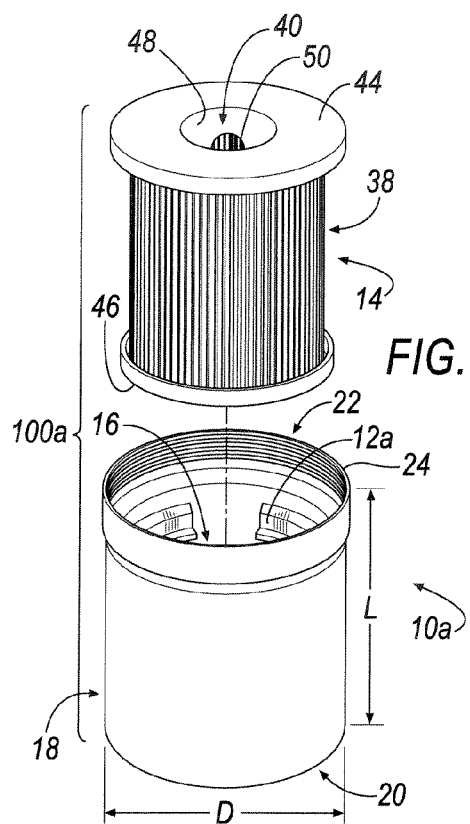
FIG. 1A is an exploded view of a filter assembly in accordance with an exemplary embodiment of the invention.
Figure 1B:
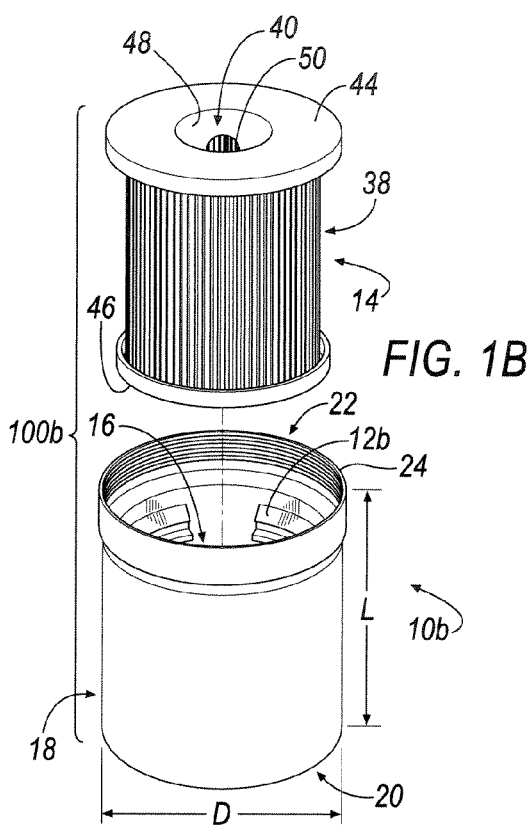
FIG. 1B is an exploded view of a filter assembly in accordance with an exemplary embodiment of the invention.
Figure 1C:
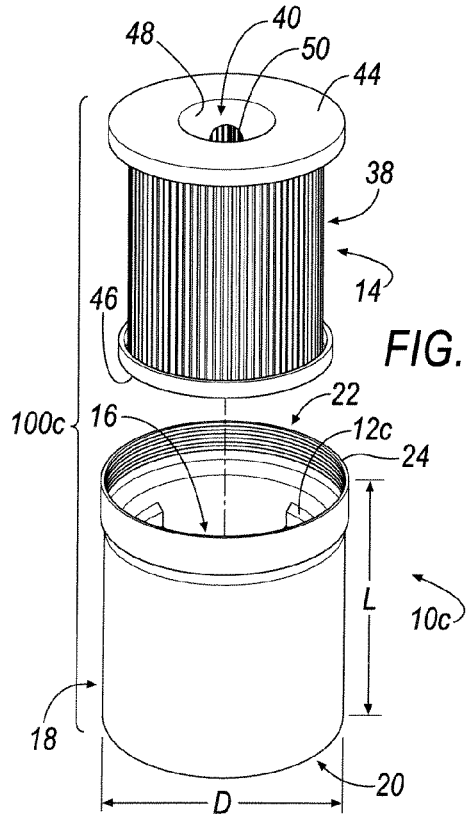
FIG. 1C is an exploded view of a filter assembly in accordance with an exemplary embodiment of the invention.
Figure 1D:
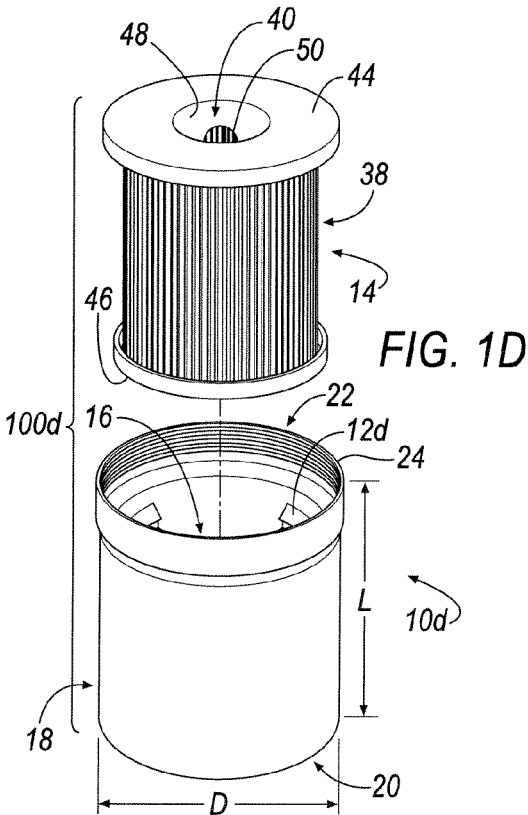
FIG. 1D is an exploded view of a filter assembly in accordance with an exemplary embodiment of the invention.
Figure 2A:
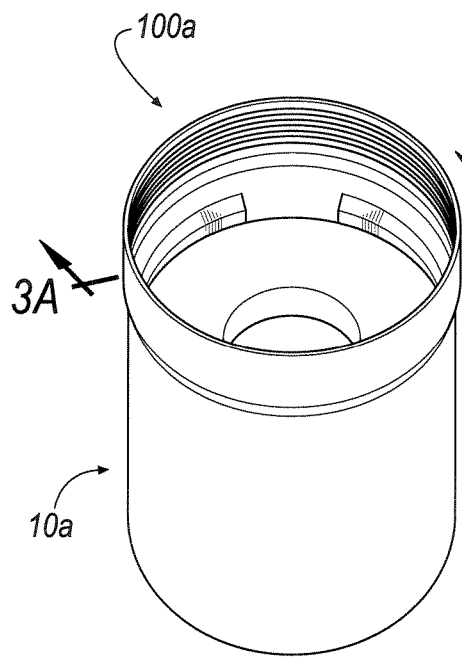
FIG. 2A is a perspective view of the filter assembly of FIG. 1A.
Figure 2B:
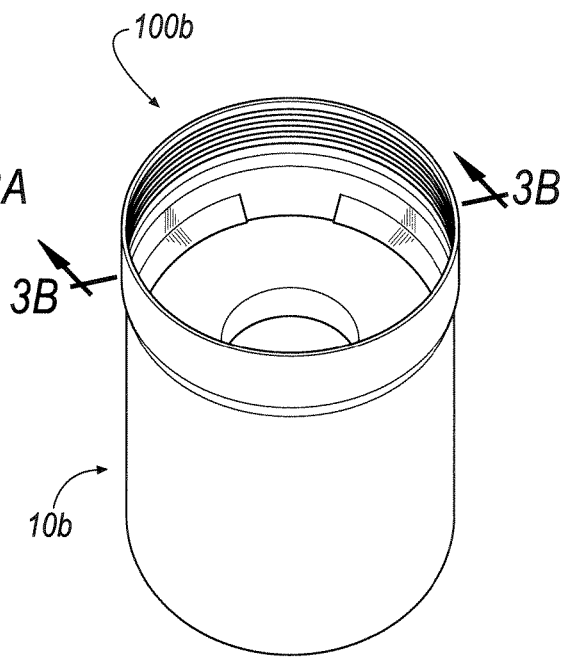
FIG. 2B is a perspective view of the filter assembly of FIG. 1B.
Figure 2C:
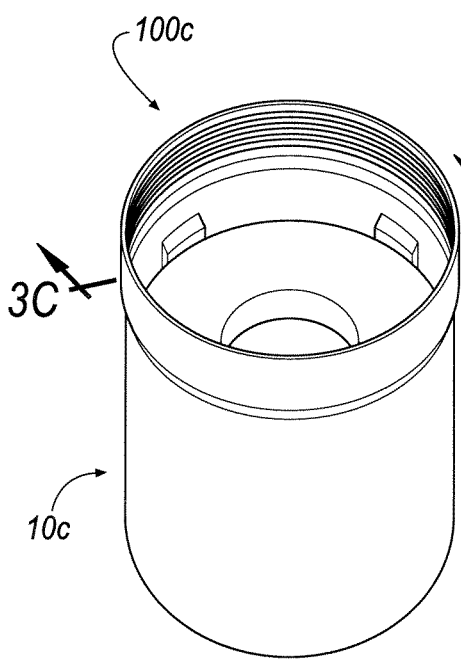
FIG. 2C is a perspective view of the filter assembly of FIG. 1C.
Figure 2D:
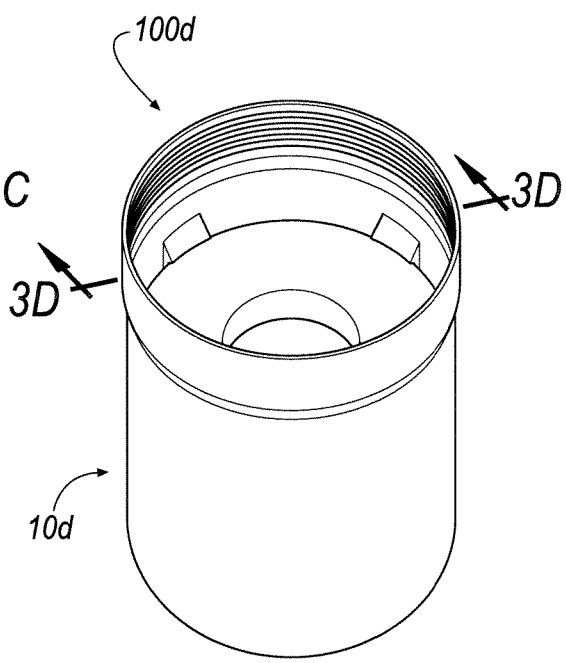
FIG. 2D is a perspective view of the filter assembly of FIG. 1D.

The Figures illustrate exemplary embodiments filter containers and a filter assembly in accordance with an embodiment of the invention. The disclosure hereof will illustrate and describe exemplary embodiments of a filter container, a filter assembly, and a method of manufacturing the same. According to an embodiment, the filter container (e.g., housing or cover) includes one or more filter retaining elements for retaining a filter within a cavity defined by the filter container. Based on the foregoing, it is to be generally understood that the nomenclature used herein is simply for convenience and the terms used to describe the invention should be given the broadest meaning by one of ordinary skill in the art.

Referring to FIGS. 1A-2D, a filter container is shown generally at 10a-10d, respectively, according to various embodiments. In an embodiment, each filter container 10a-10d generally defines a cylindrical shape having a circumferential wall portion 18, a closed-end wall portion 20, and a passage 22 defining an open end 24 that provides access to a cavity, which is shown generally at 16. As illustrated, the cavity 16 includes a dimension that is sized for receiving a filter or a portion of a filter, which is shown generally at 14. The dimension of the cavity 16 is generally defined by the length, L, and diameter, D, of the circumferential wall portion 18 and the closed-end wall portion 20.

Referring to FIGS. 3A-3D, the circumferential wall portion 18 defines an inner surface 26 and an outer surface 28. As illustrated, the inner surface 26 may include a threaded portion 30 and an inlet seal 32 proximate the passage 22. Although the threaded portion 30 and inlet seal 32 are shown disposed on the inner surface 26 proximate the passage 22, it will be appreciated that the threaded portion 30 and/or seal 32 may be disposed on the outer surface 28 in an alternative embodiment.

The inner surface 26 of each filter container 10a-10d is also defined by one or more filter retaining elements 12a-12d that retain the filter 14 in the filter container 10a-10d. As illustrated, each filter retaining element 12a-12d extends from the inner surface 26 toward a central axis, A-A. As illustrated, the central axis, A-A, extends through and defines a central axis of the container 10a-10d.

Figure 3A:
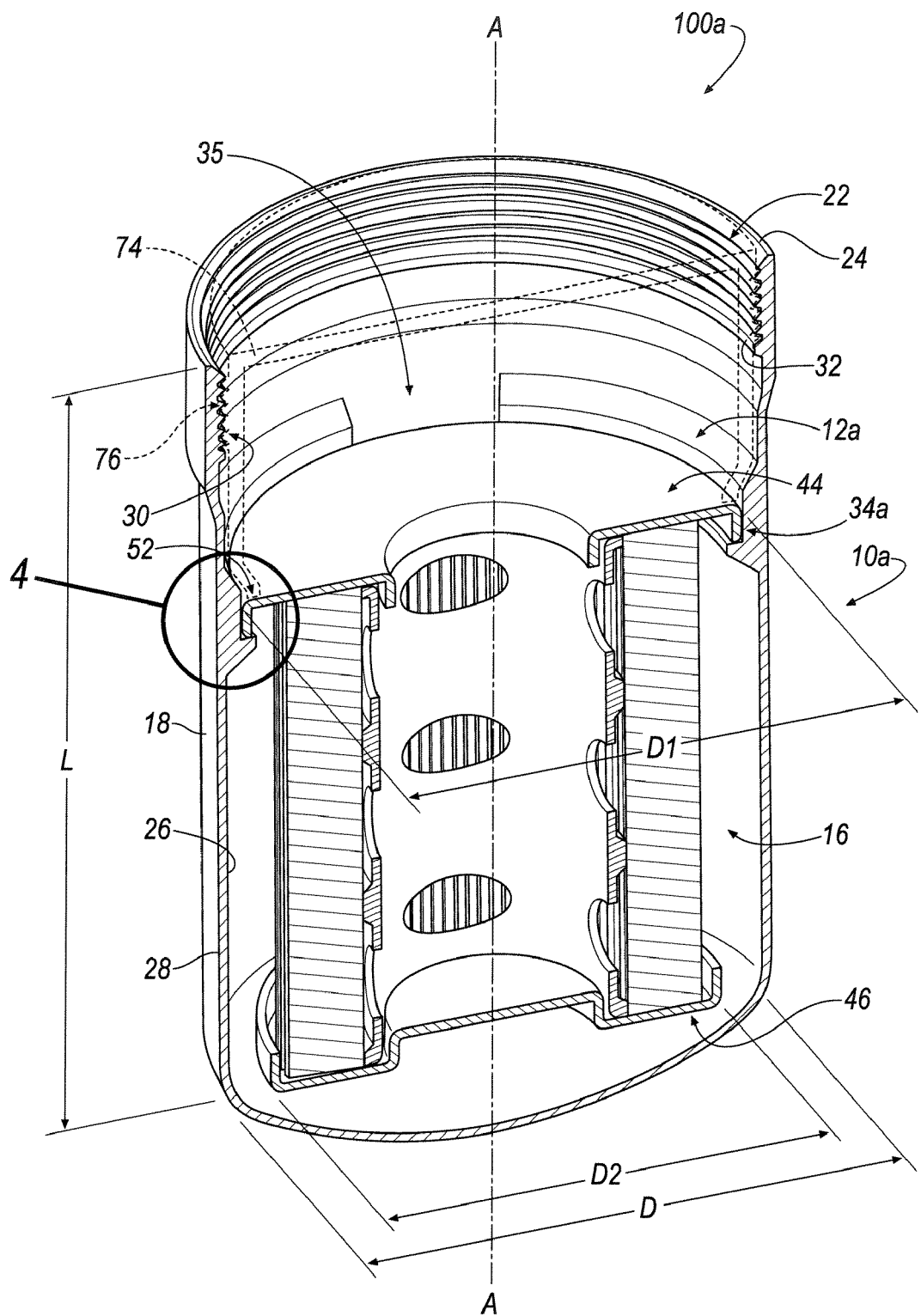
FIG. 3A is a cross-sectional view of the filter assembly according to line 3A-3A of FIG. 2A in accordance with an exemplary embodiment of the invention.
Figure 3B:
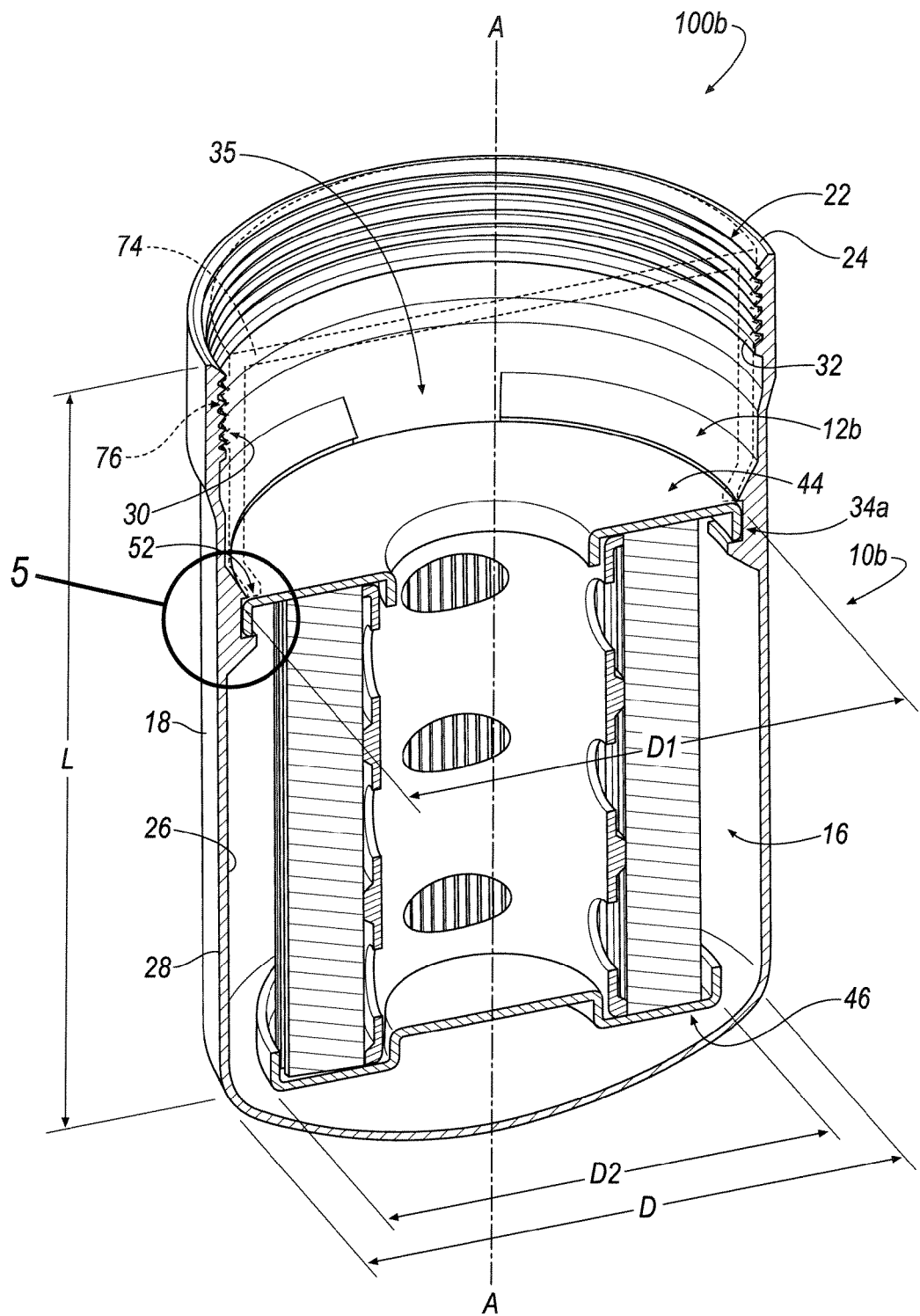
FIG. 3B is a cross-sectional view of the filter assembly according to line 3B-3B of FIG. 2B in accordance with an exemplary embodiment of the invention.

As illustrated in FIGS. 3A and 3B, each filter retaining element 12a, 12b defines a portion of a circumferential ring 34a having an interruption between each filter retaining element 12a, 12b, which are shown generally at 35, to provide a fluid-flow clearance gap. The circumferential ring 34a radially extends inwardly, from the inner surface 26, toward the central axis, A-A.

Figure 3C:
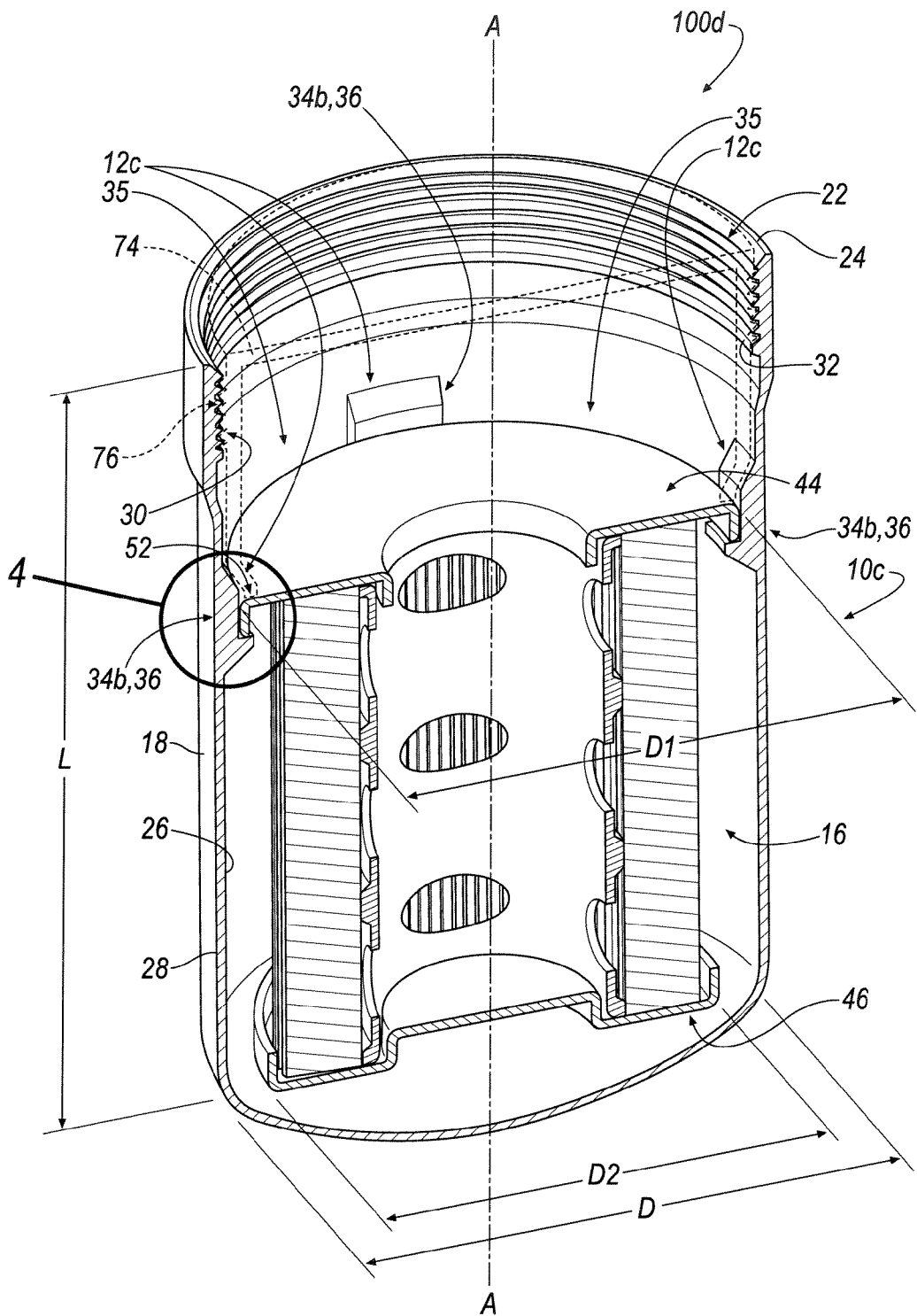
FIG. 3C is a cross-sectional view of the filter assembly according to line 3C-3C of FIG. 2C in accordance with an exemplary embodiment of the invention.
Figure 3D:
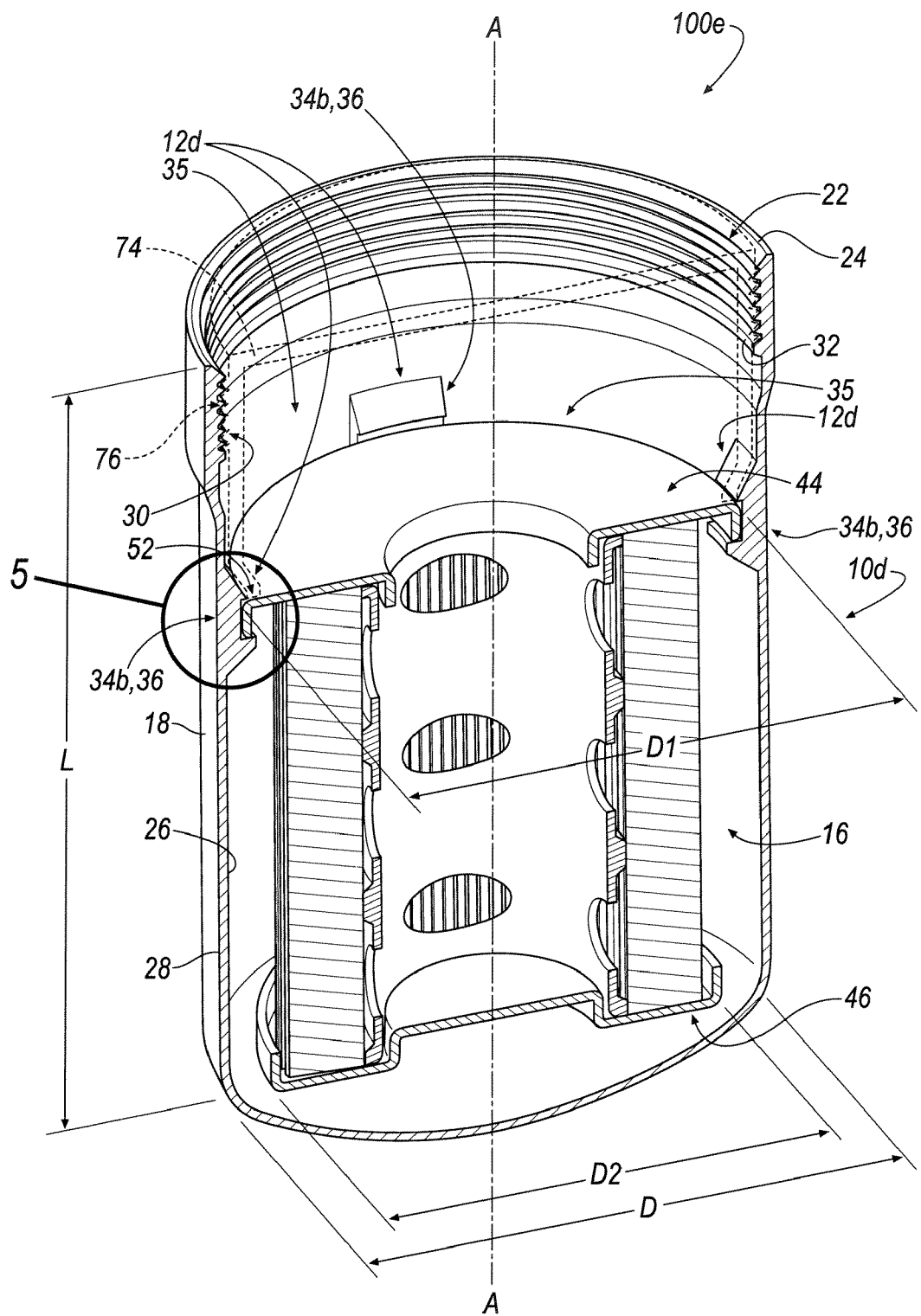
FIG. 3D is a cross-sectional view of the filter assembly according to line 3D-3D of FIG. 2D in accordance with an exemplary embodiment of the invention.

According to an embodiment, as illustrated in FIGS. 3C and 3D, a filter container 10c, 10d is shown including four filter retaining elements. As illustrated, each ring filter retaining element radially extends, from the inner surface 26, inwardly toward the central axis, A-A.

According to an embodiment, each of the four ring segment 36 may be spaced equidistantly. However, it will be appreciated upon considering the present disclosure that the number and spacing of filter retaining elements 35 is not limited to the above-described embodiment and that any desirable number or spacing of filter retaining elements 36 may be provided, as desired.

Referring again to FIGS. 1A-1D, the filter 14 is shown according to an embodiment. As illustrated, the filter 14 includes a pleated filter media 38 that is formed into a substantially cylindrical shape having a central passage 40.

With continued reference to FIGS. 1A-1D, in an embodiment, the filter 14 includes an upper end cap 44, and a lower end cap 46. In an embodiment, the filter 14 may include a central passage member 48 having a plurality of radial passages 50. Referring to FIGS. 3A-3D, the upper and lower end caps 44, 46 each include a lip portion 52 that axially extends from each upper and lower end cap 44, 46. According to an embodiment, the lip portion 52 of each upper and lower end cap 44, 46 axially extend toward each other.

According to an embodiment, as seen in FIGS. 2A-2D, the filter 14 is shown disposed in the cavity 16 of each filter container 10a-10d to define a filter assembly 100a-100d, respectively. When the filter 14 is disposed in the cavity 16 as shown in FIGS. 3A-3D, the substantially rigid lip portion 52 engages the one or more integrated filter retaining elements 12a-12d.

Figure 4:
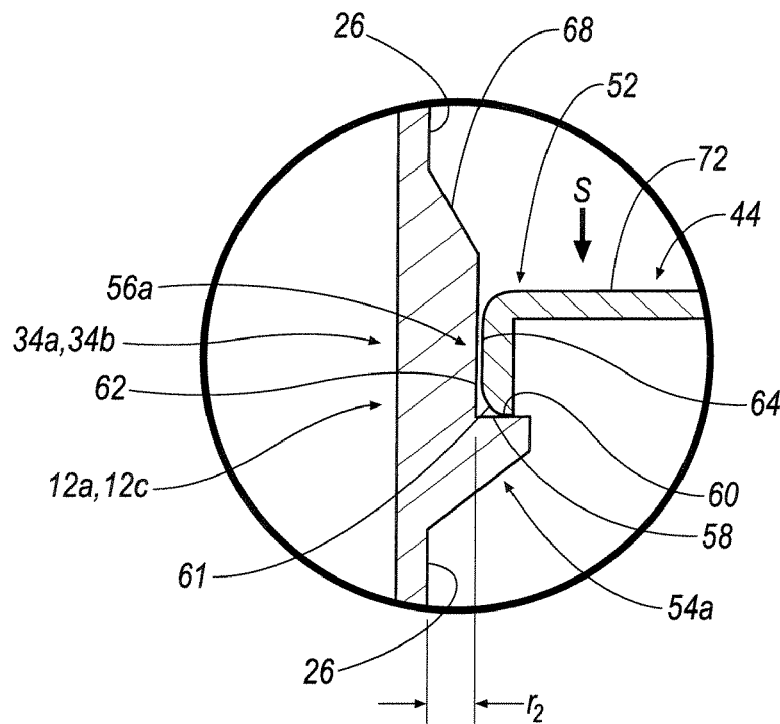
FIG. 4 is an enlarged cross-sectional view of FIGS. 3A and 3C according to line 4 in accordance with an exemplary embodiment of the invention.

Referring to FIG. 4, the one or more filter retaining elements 12a, 12c includes a shoulder 54a that defines an interface surface 56a of the ring 34a, 34b. According to an embodiment, the interface surface 56a includes a ledge surface 58 for engaging an inner surface or circumferential end 60 of the substantially rigid lip portion 52 and a wall surface 62 for engaging a side or circumferential perimeter 64 of the lip portion 52. In general, the ledge surface 58 and wall surface 62 are substantially perpendicular and define an L-shaped interface surface 56a. According to an embodiment, the lip portion 52 is correspondingly-sized to mate with at least one of the L-shaped interface surface 56a provided by the ledge surface 58 and wall surface 62.

Figure 5A:
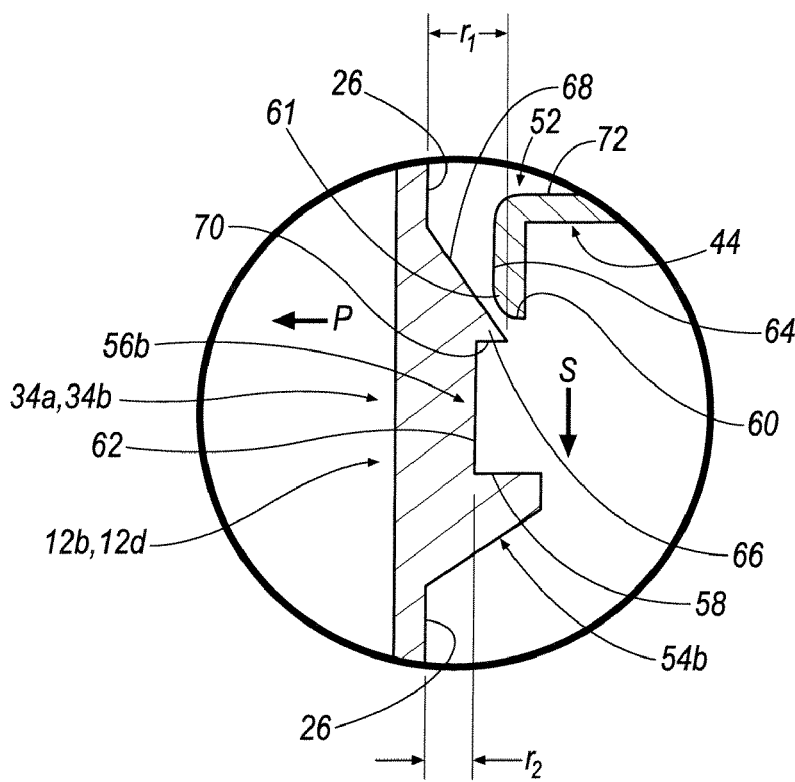
FIG. 5A is an enlarged cross-sectional view referenced generally according to line 5 in FIGS. 3B and 3D in accordance with an exemplary embodiment of the invention.
Figure 5B:
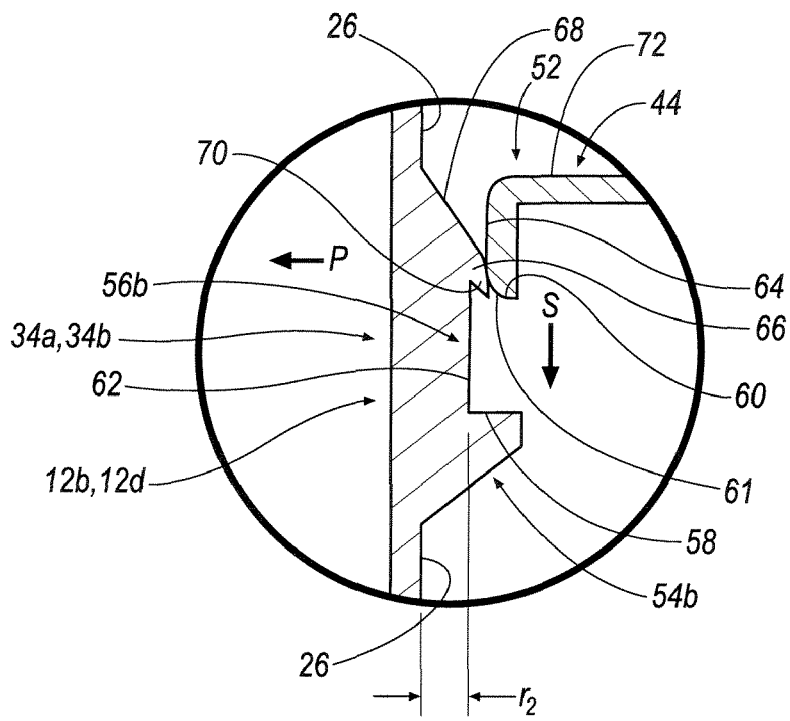
FIG. 5B is an enlarged cross-sectional view referenced generally according to line 5 in FIGS. 3B and 3D in accordance with an exemplary embodiment of the invention.
Figure 5C:
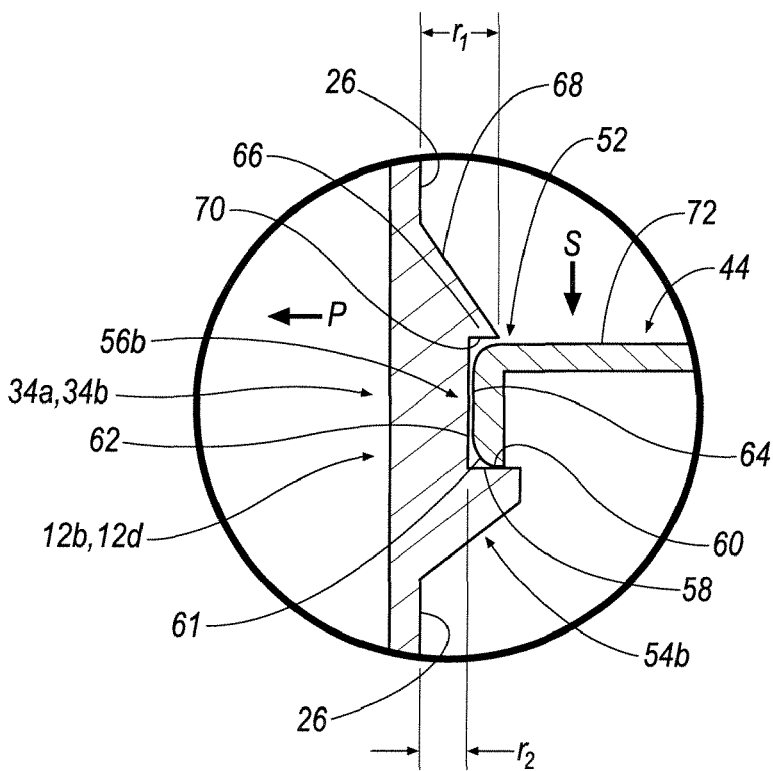
FIG. 5C is an enlarged cross-sectional view of FIGS. 3B and 3D according to line 5 in accordance with an exemplary embodiment of the invention.

According to an embodiment, as seen in FIGS. 5A-5C, the one or more integrated filter retaining elements 12b, 12d include a shoulder 54b that defines an interface surface 56b of the ring 34a, 34b. According to an embodiment, the interface surface 56b includes a ledge surface 58 and a wall surface 62 for engaging, respectively, the circumferential end 60 and circumferential perimeter 64 of the lip portion 52. According to an embodiment, the lip portion 52 is correspondingly-sized to generally mate with at least one of the L-shaped interface surface 56b provided by the ledge surface 58 and wall surface 62.

In an embodiment, the interface surface 56b can include a means for locking the filter 14 to the container 10b, 10d, which is shown generally at 66. According to an embodiment, the locking means 66 may be referred to as a nose portion 66. In an embodiment, the nose portion 66 is defined by a ramp surface 68, which is proximate the passage 22, extending from the inner surface 26. As illustrated, the ramp surface 68 may extend from the inner surface 26, at a radial distance, $r_1$, toward the central axis, A-A. In an embodiment, the wall surface 62 can extend from the inner surface 26, at a radial distance, $r_2$, toward the central axis, A-A. According to an embodiment, when referenced from the inner surface 26, the radial distance, $r_1$, is greater than, but may be approximately equal to the radial distance, $r_2$, of the wall surface 62.

Referring to FIGS. 3B, 3D, and 5C, the circumferential perimeter 64 of the upper end cap 44 may be defined, for example, by a diameter, D1, that is approximately equal to, but greater than a passage diameter, D2, of the cavity 16 that is defined by the ring 34a, 34b including the shoulder 54b and nose portion 66. According to an embodiment, the lower end cap 46 includes a diameter that is less than the diameter, D1, of the upper end cap 44. According to an embodiment, the diameter of the lower end cap 46 is approximately equal to or less than the diameter, D2, of the cavity 16. As such, because the passage diameter, D2, is smaller than the diameter, D1, of the upper end cap 44, the nose portion 66 may include an elastic characteristic that permits temporary deformation of the nose portion 66 (i.e., FIG. 5B) as the diameter, D1, of upper end cap 44 becomes engaged with the nose portion 66 that includes a smaller diameter, D2.

Figure 6:
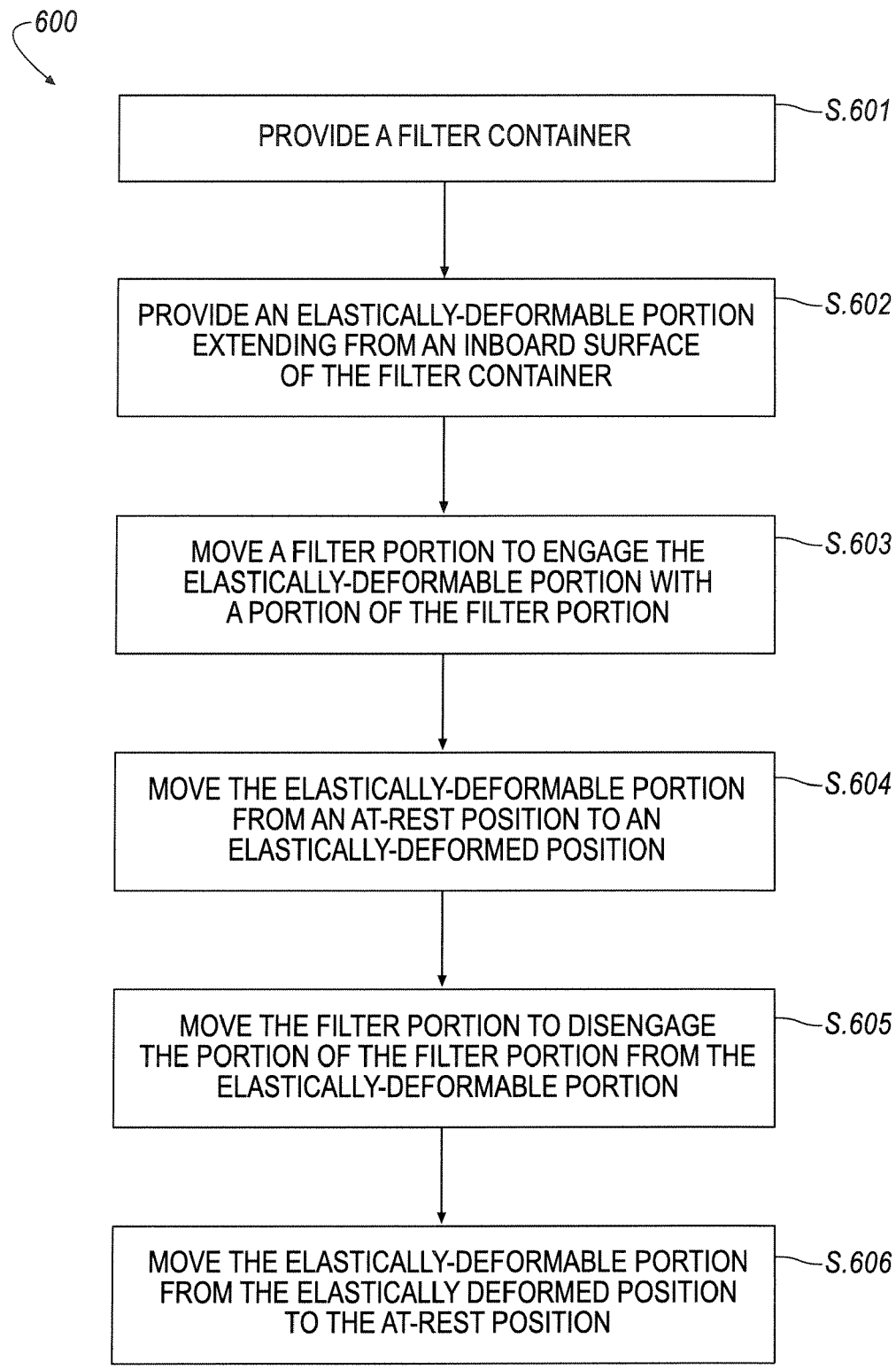
FIG. 6 is a flow chart illustrating a method for assembling a filter assembly in accordance with an exemplary embodiment of the invention.

Referring to FIGS. 5A-6, a method for assembling the filter assembly 100b, 100d is shown generally at 600 according to an embodiment. First, referring to FIGS. 5A and 5B, the circumferential end 60 of the substantially rigid lip portion 52 engages the ramp surface 68 (i.e., FIG. 5A and step S.603) according to the direction of the arrow, S. Then, as seen in FIG. 5B, the circumferential perimeter 64 of the substantially rigid lip portion 52 may cause the nose portion 66 (e.g., the "elastically-deformable portion" of steps S.602-S.606) to be moved (i.e., step S.604) in the direction of the arrow, S, and/or in a direction substantially perpendicularly away from the central axis, A-A, according to the direction of arrow, P.

If desired, the circumferential end 60 may include a rounded edge 61 to permit the substantially rigid lip portion 52 to pass the elastically-deformable nose portion 66 with less resistance. It will be appreciated that the rigid quality of the substantially rigid lip portion 52 resists bending or deformation of the circumferential end 60 and circumferential perimeter 64 while the nose portion 66 extending from the inner surface 26 of the container 10b, 10d is permitted to be elastically deformed during assembly of the filter assembly 100b, 100d.

Referring to FIG. 5C, once the circumferential end and perimeter 60, 64 of the lip portion 52 passes the nose portion 66 (i.e., steps S.605, S.606), an inner edge surface 70 of the nose portion 66 may engage an outer surface 72 of the upper end cap 44. In addition, once the circumferential end and perimeter 60, 64 of the lip portion 52 disengages the nose portion 66 as described above, the elastically-deformable nose 66 may move from an elastically-deformed position (i.e. FIG. 5B) to an original, at-rest position (i.e. FIG. 5C), causing an audible "snap" to be heard, thereby providing an audible alert that the filter 14 has been locked into place with the container 10b, 10d by way of the interface surface 56b. Thus, the nose portion 66 may also be referred to as a "snap-fit" locking arrangement integrated with the container 10b, 10d that locks the filter 14 in place relative the container 10b, 10d.

According to an embodiment, when the filter assembly 100a-100d is assembled as described above in FIGS. 4-5C, the lip portion 52 may be positioned adjacent the interface surface 56a, 56b by way of a force applied to the outer surface 72 of the upper end cap 44. According to an embodiment, the force applied to the outer surface 72 of the upper end cap 44 may be provided in the direction of the arrow, S, by hand, a tool, or the like of an installer.

In an embodiment, as seen in FIGS. 3A-3D, the force, applied to the outer surface 72 of the upper end cap 44 in the direction of the arrow, S, may be directly provided by a close-out member 74 (shown in phantom), which may include a threaded portion 76 (also shown in phantom). According to an embodiment, the close-out member 74 may be a removable cap that is spun onto the threaded portion 30 of the filter container 10a-10d. According to another embodiment, the close-out member 74 may be a base portion interface extending from an internal combustion engine; as such, the filter container 10a-10d may be spun onto the close-out member 74 to directly apply a force in the direction of the arrow, S, to the outer surface 72 of the upper end cap 44.

Figure 7A:
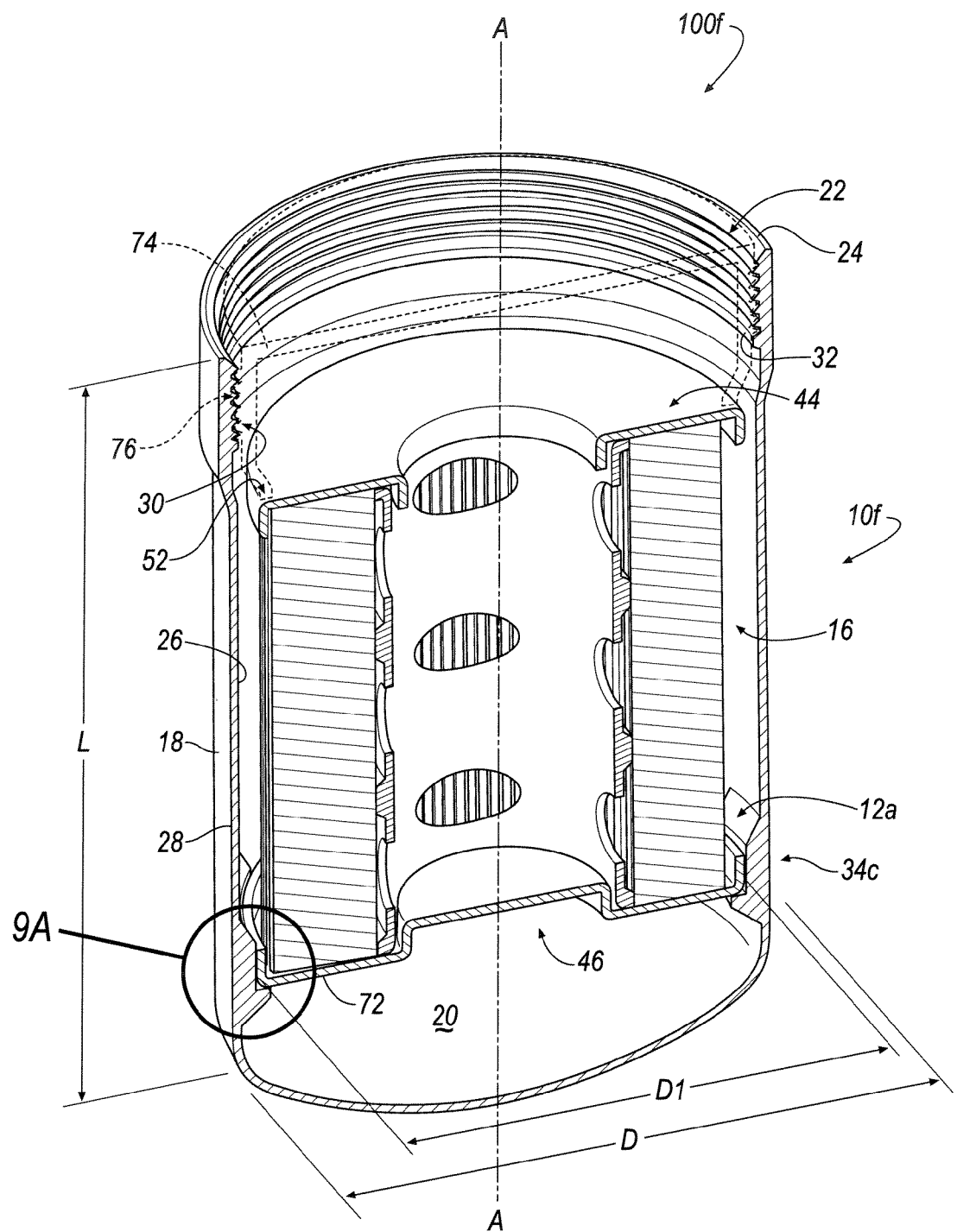
FIG. 7A is a cross-sectional view of a filter assembly in accordance with an exemplary embodiment of the invention.

Referring to FIG. 7A a filter assembly is shown generally at 100f according to an embodiment. The filter assembly 100f includes a filter container 10f including a circumferential ring 34c. Circumferential ring 34c of the filter container 10f is located proximate the closed end-wall portion 20 such that the circumferential ring 34c may engage the outer surface 72 of the lower end cap 46. By incorporating the circumferential ring proximate the closed end-wall portion 20 and retaining the filter 14 within the cavity on this end, the first end cap and the second end cap can bear an equal diameter without the pitfalls that would be typically associated with retaining the filter by the other cap. In this regard, the filter media may be attached to both end caps such that no, or a de minimis amount, of space exists between the lip of the end cap and the filter media attach thereto.

Figure 9A:
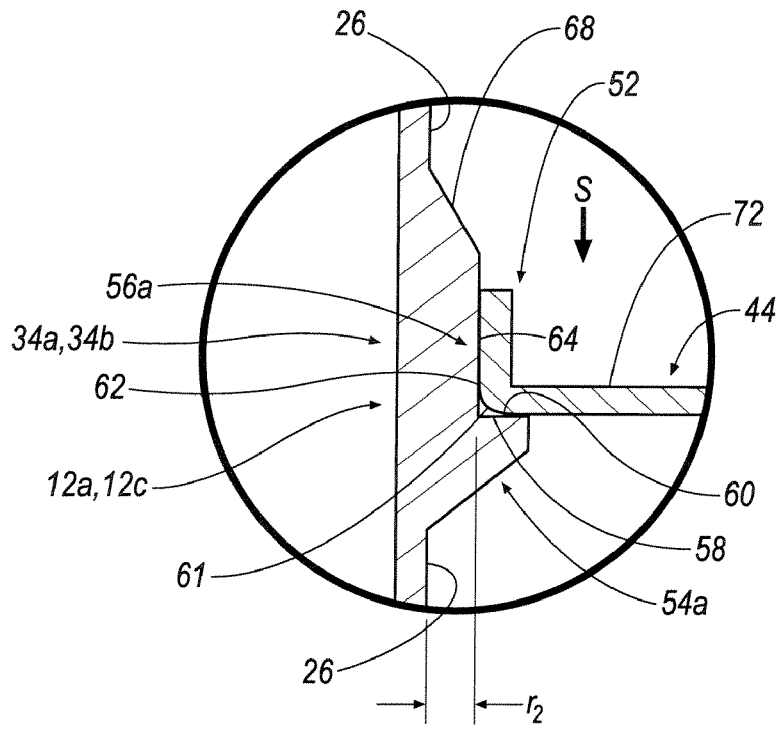
FIG. 9A is an enlarged cross-sectional view of FIG. 7A in accordance with an exemplary embodiment of the invention.

Referring to FIG. 9A, the one or more filter retaining elements 12a, 12c includes a shoulder 54a that defines an interface surface 56a of the ring 34a, 34b. According to an embodiment, the interface surface 56a includes a ledge surface 58 for engaging an inner surface or circumferential end 60 of the substantially rigid lip portion 52 and a wall surface 62 for engaging a side or circumferential perimeter 64 of the lip portion 52. In general, the ledge surface 58 and wall surface 62 are substantially perpendicular and define an L-shaped interface surface 56a. According to an embodiment, the lip portion 52 is correspondingly-sized to mate with at least one of the L-shaped interface surface 56a provided by the ledge surface 58 and wall surface 62.

Figure 7B:
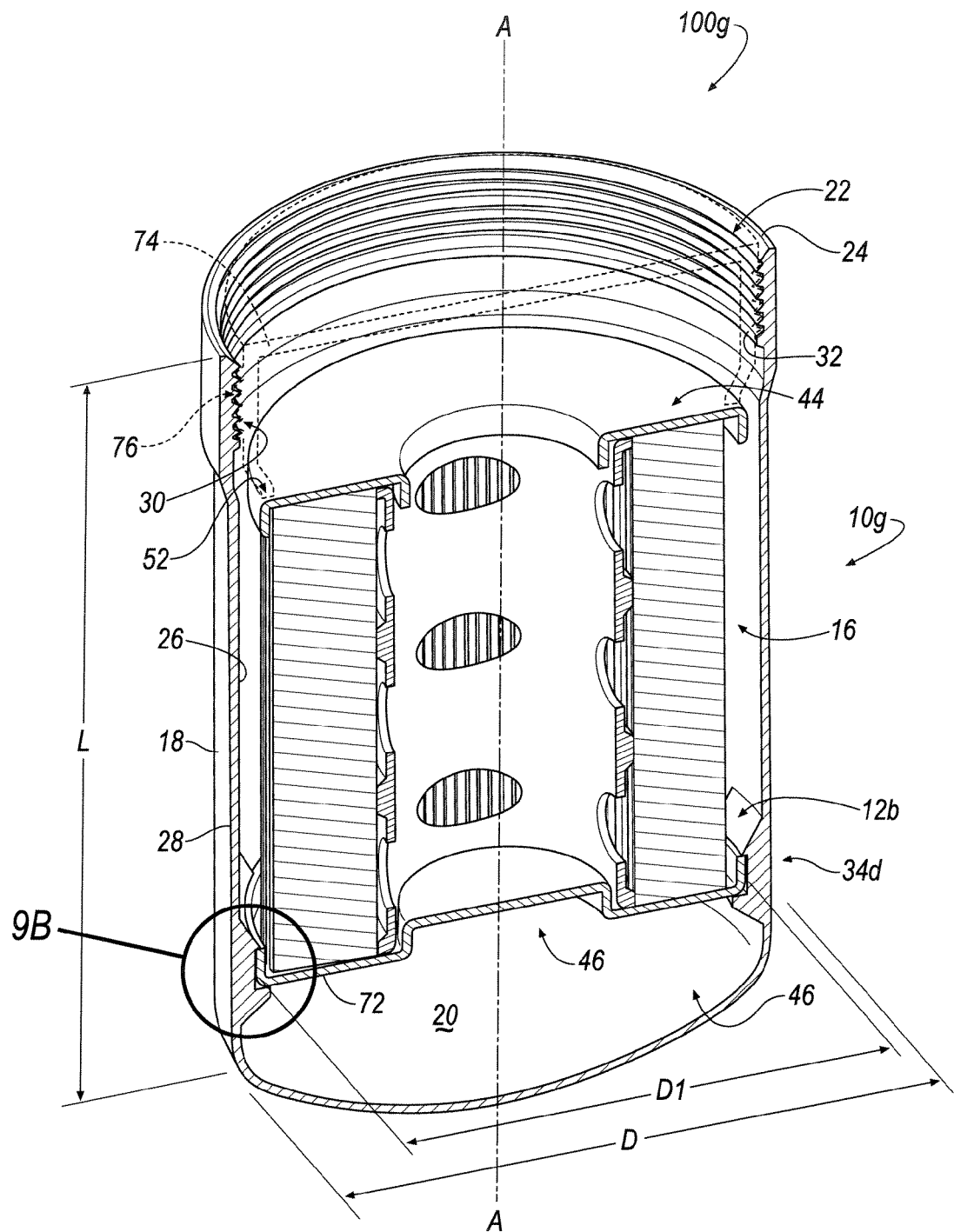
FIG. 7B is a cross-sectional view of the filter assembly in accordance with an exemplary embodiment of the invention.

Referring to FIG. 7B, a filter assembly is shown generally at 100g according to an embodiment. The filter assembly 100g includes a filter container 10g including a circumferential ring 34d. The circumferential ring 34d of the filter container 10g is located proximate the closed end-wall portion 20 such that the circumferential ring 34d may engage the outer surface 72 of the lower end cap 46.

Figure 8A:
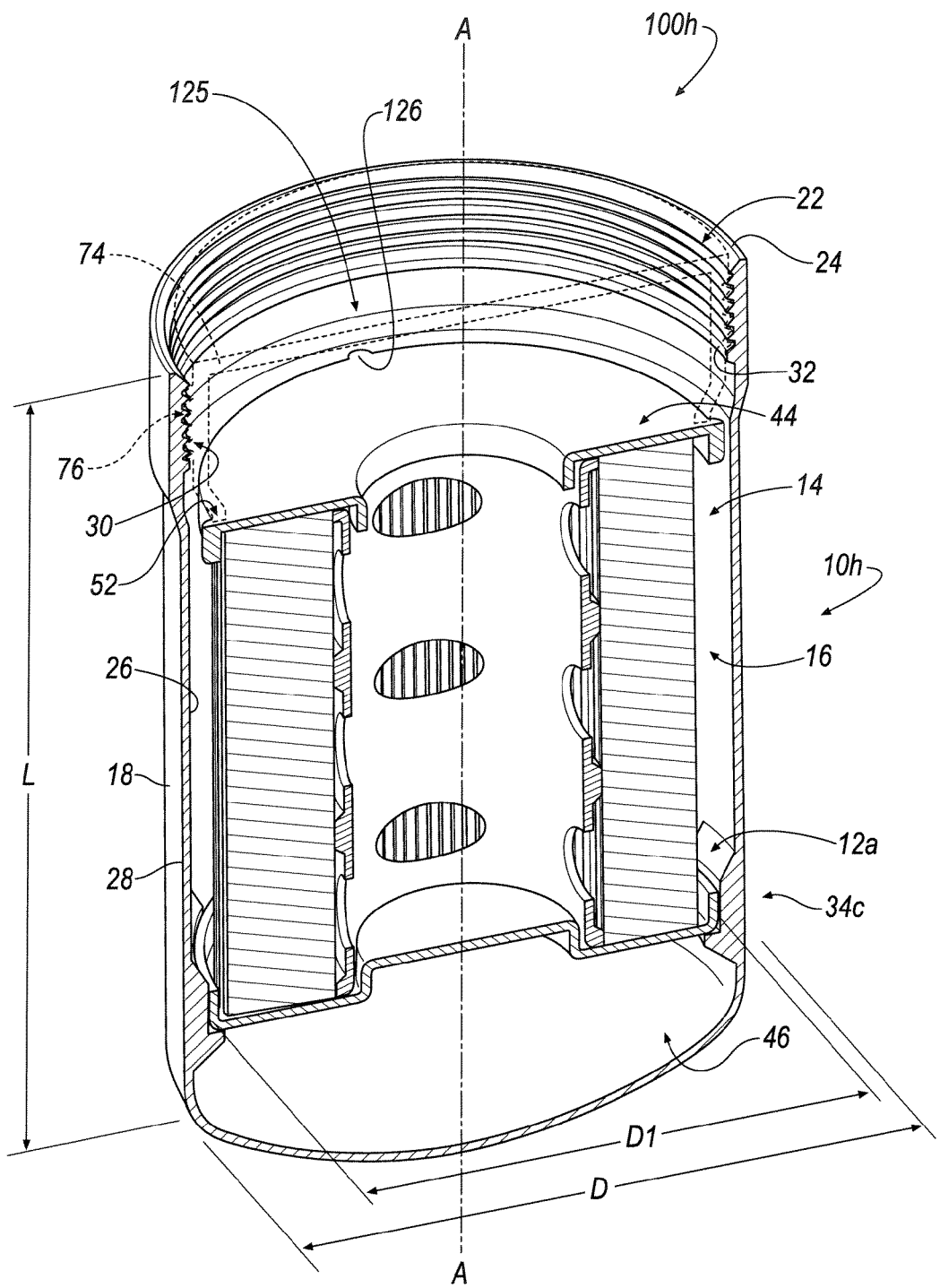
FIG. 8A is a cross-sectional view of the filter assembly in accordance with an exemplary embodiment of the invention.
Figure 8B:
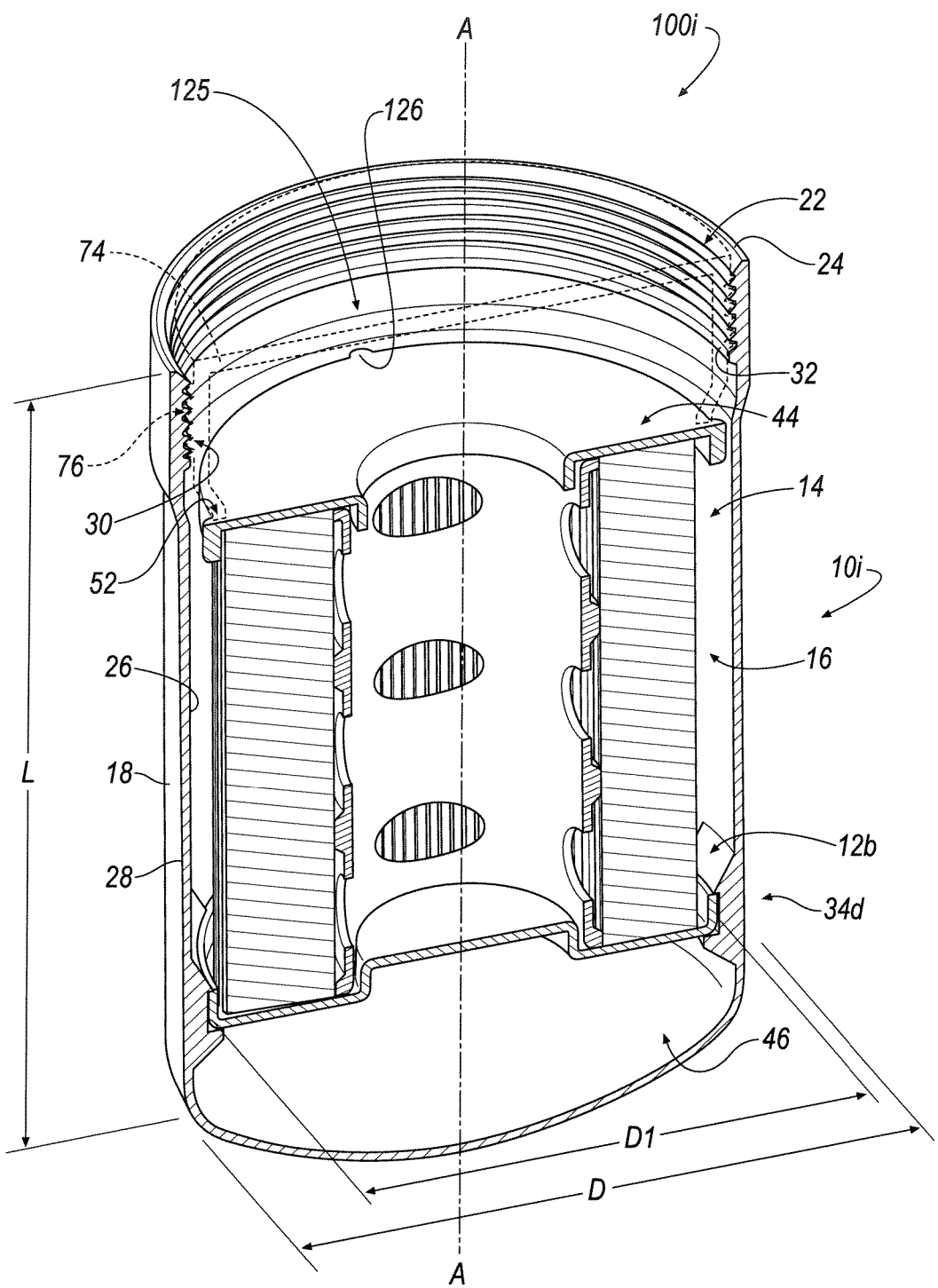
FIG. 8B is a cross-sectional view of the filter assembly in accordance with an exemplary embodiment of the invention.
Figure 9B:
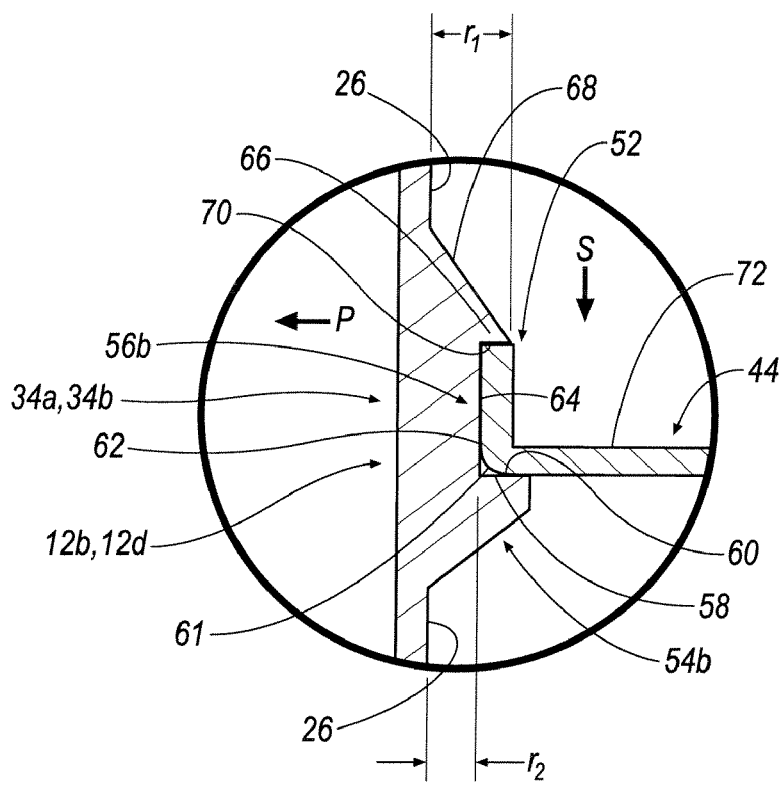
FIG. 9B is an enlarged cross-sectional view of FIG. 7B in accordance with an exemplary embodiment of the invention.

According to the embodiment depicted in FIGS. 7B, 8B and 9B, the one or more integrated filter retaining elements 12b, 12d include a shoulder 54b that defines an interface surface 56b of the ring 34a, 34b. According to an embodiment, the interface surface 56b includes a ledge surface 58 and a wall surface 62 for engaging, respectively, the circumferential end 60 and circumferential perimeter 64 of the lip portion 52. According to an embodiment, the lip portion 52 is correspondingly-sized to generally mate with at least one of the L-shaped interface surface 56b provided by the ledge surface 58 and wall surface 62.

In an embodiment, the interface surface 56b can include a means for locking the filter 14 to the container 10g, 10i, which is shown generally at 66. According to an embodiment, the locking means 66 may be referred to as a nose portion 66. In an embodiment, the nose portion 66 is defined by a ramp surface 68, which is proximate the passage 22, extending from the inner surface 26. As illustrated, the ramp surface 68 can extend from the inner surface 26, at a radial distance, $r_1$, toward the central axis, A-A. The wall surface 62 can extend from the inner surface 26, at a radial distance, $r_2$, toward the central axis, A-A. According to an embodiment, when referenced from the inner surface 26, the radial distance, $r_1$, is greater than, but may be approximately equal to the radial distance, $r_2$, of the wall surface 62.

Referring to FIGS. 8A and 8B a filter assembly is shown generally at 100h and 100i. According to an embodiment, the filter assembly 100h includes one or more centering elements 125 for aligning the filter 14 in the filter container 10h. In an embodiment, the centering elements 125 are generally defined by one or more projections 126 that radially extend from the end caps 44 relatingly engage the inner structure 26 and center the end cap 44 formed within the inner surface 26 of the filter container 10h.

Figure 10:
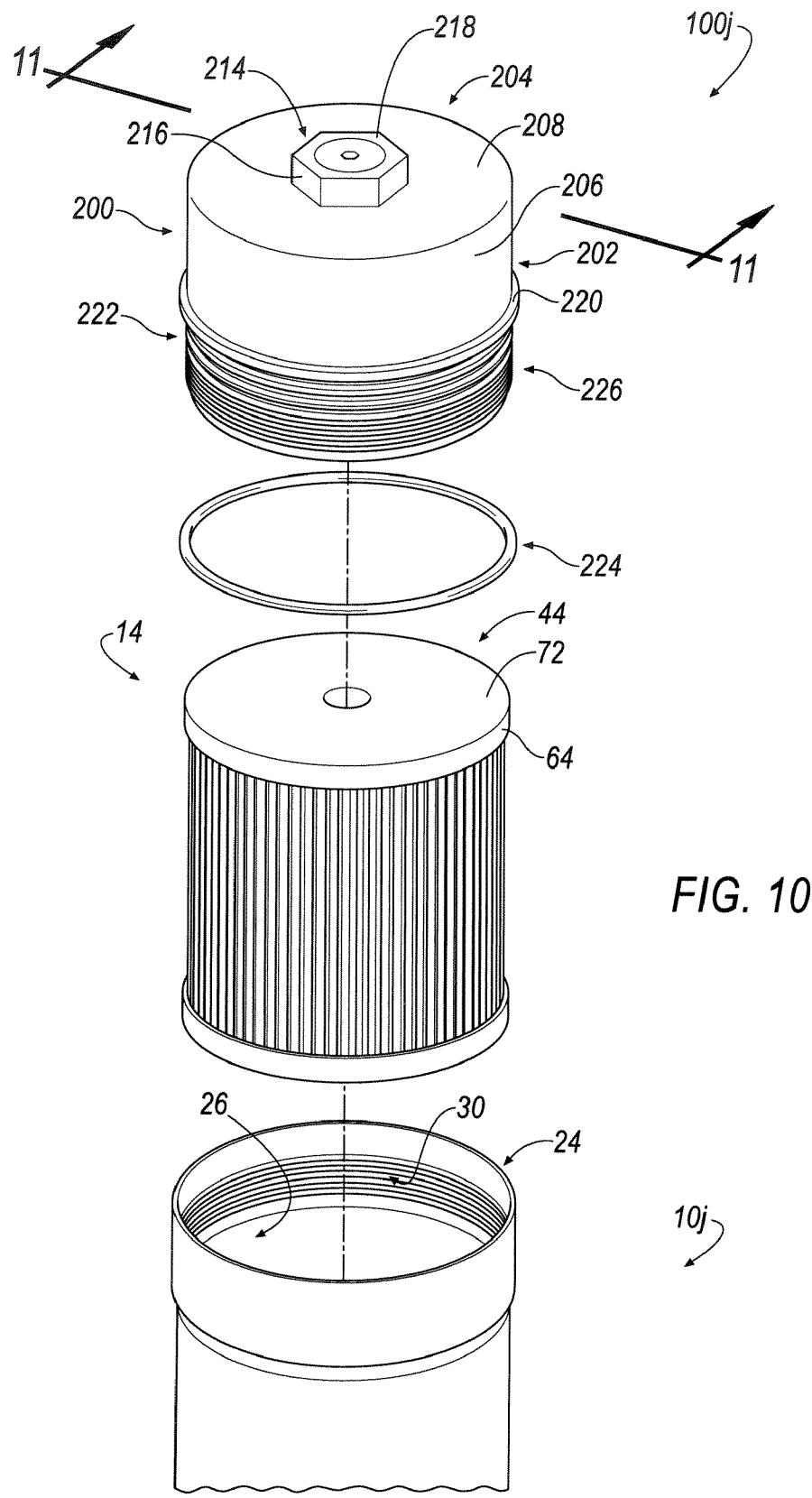
FIG. 10 is an exploded, perspective view of a filter assembly in accordance with an exemplary embodiment of the invention.

Referring to FIG. 10 a filter assembly 100j is shown in accordance with an embodiment of the invention. In an embodiment, the filter assembly 100j includes a filter 14 disposable in a container, such as, for example, a container 10j. In an embodiment, the container 10j may include an upstream passage (not shown) that permits dirty or unfiltered fluid to enter the container 10j and a downstream passage (not shown) that permits clean/filtered fluid to exit the container 10j.

Further, the filter assembly 100j includes a close-out member, which is shown generally at 200 in accordance with an embodiment of the invention. In an embodiment, the close-out member 200 is removably securable to the container 10j proximate an open end 24 of the container 10j.

According to an embodiment, the close-out member 200 may generally define a cup-shaped, removable cap having a circumferential wall 202 and an end wall 204. In an embodiment, the close-out member 200 may include an outer circumferential surface 206, an outer end wall surface 208, an inner circumferential surface 210 (see, e.g., FIGS. 11A-11C), and an inner end wall surface 212 (see, e.g., FIGS. 11A-11C).

Figure 11A:
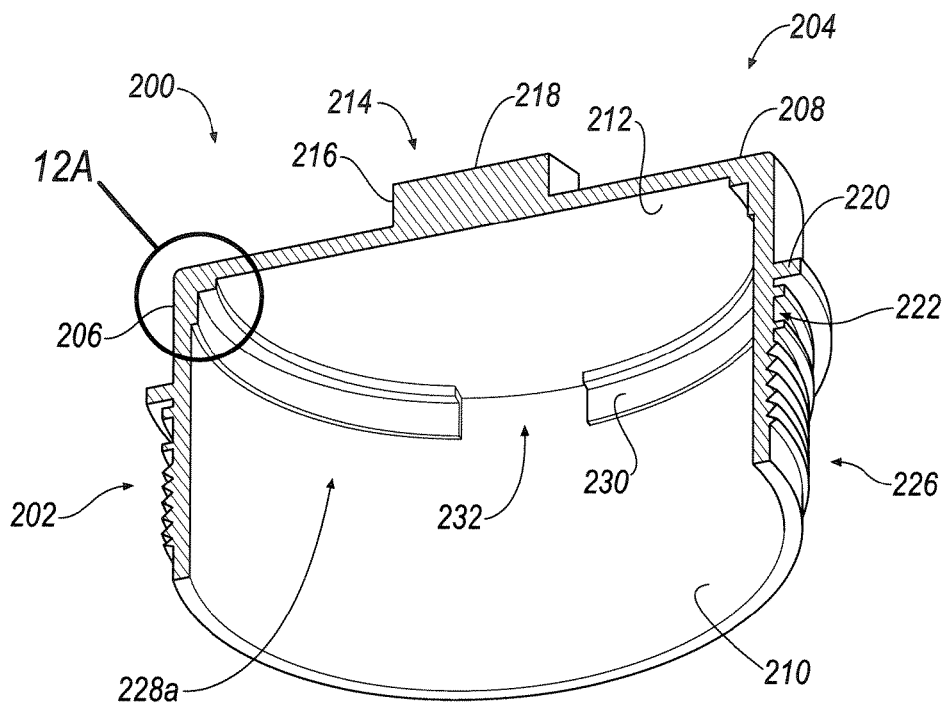
FIG. 11A illustrates a cross-sectional view of a close-out member according to line 11-11 of FIG. 10 in accordance with an exemplary embodiment of the invention.
Figure 11B:
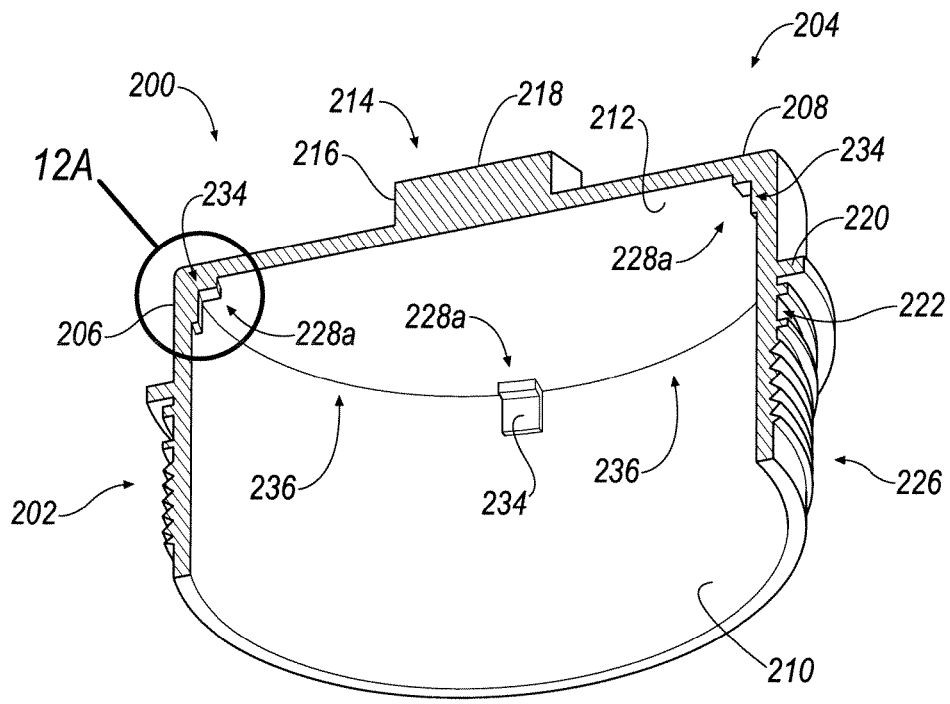
FIG. 11B illustrates a cross-sectional view of a close-out member according to line 11-11 of FIG. 10 in accordance with an exemplary embodiment of the invention.
Figure 11C:
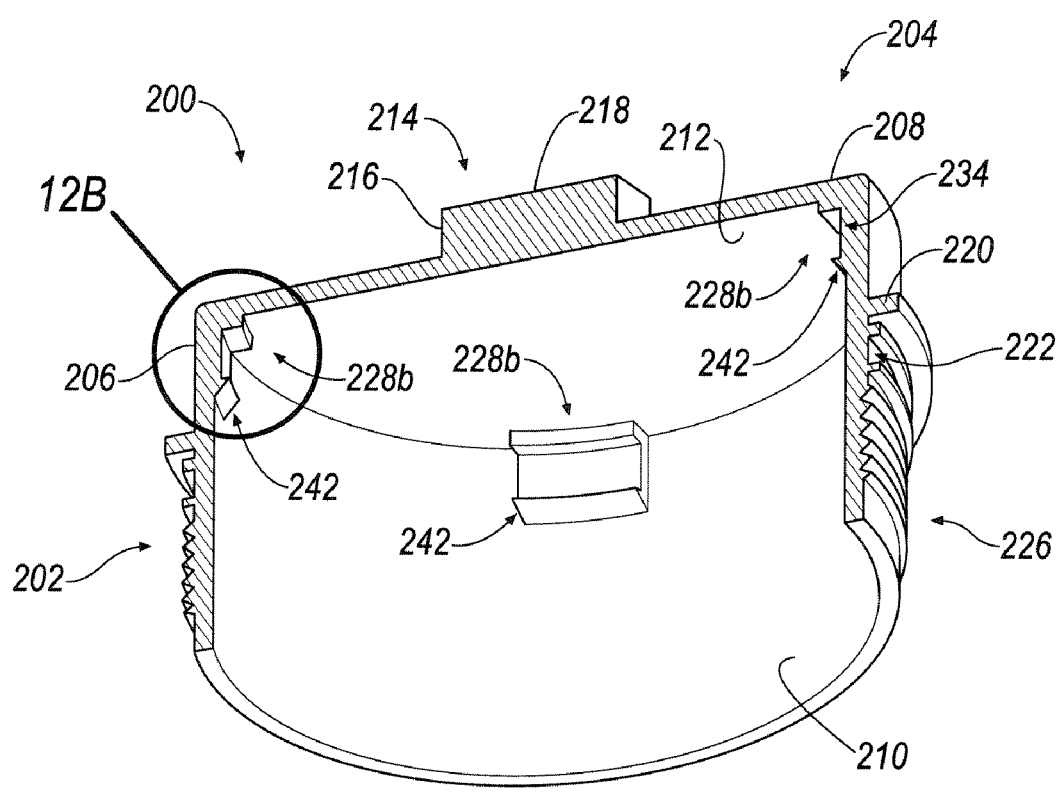
FIG. 11C illustrates a cross-sectional view of a close-out member according to line 11-11 of FIG. 10 in accordance with an exemplary embodiment of the invention.

In an embodiment, as seen in FIGS. 10-11C, a multi-faceted projection 214 may axially-extend from an axial center of the outer end wall surface 208. In an embodiment, the multi-faceted projection 214 may include a plurality of sidewalls 216 and a top wall 218. In an embodiment, the plurality of sidewalls 216 may include six walls, defining a hexagon; although, it will be appreciated that the plurality of sidewalls 216 is not limited to include six walls or define a hexagon. In an embodiment, the plurality of sidewalls 216 permits a tool, such as, for example, a wrench, clamp or the like to engage the close-out member 200 in order to tighten or loosen the close-out member 200 when the close-out member 200 is attached to the container 10j.

Figure 14A:
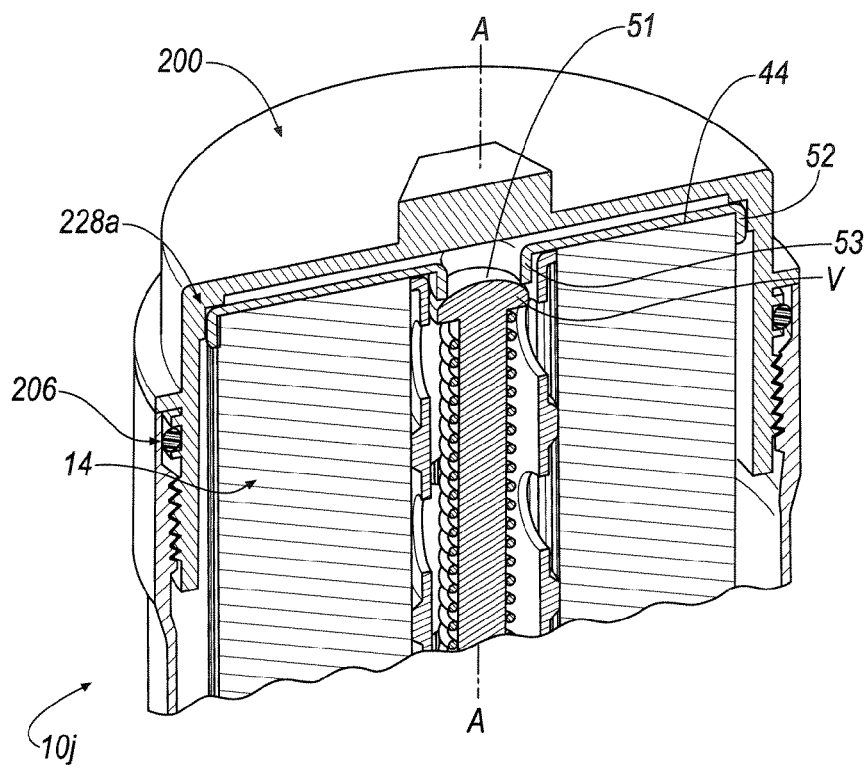
FIG. 14A illustrates an assembled, cross-sectional view of the filter assembly of FIG. 10 including the close-out member of either FIGS. 11A and 11B in accordance with an exemplary embodiment of the invention.
Figure 14B:
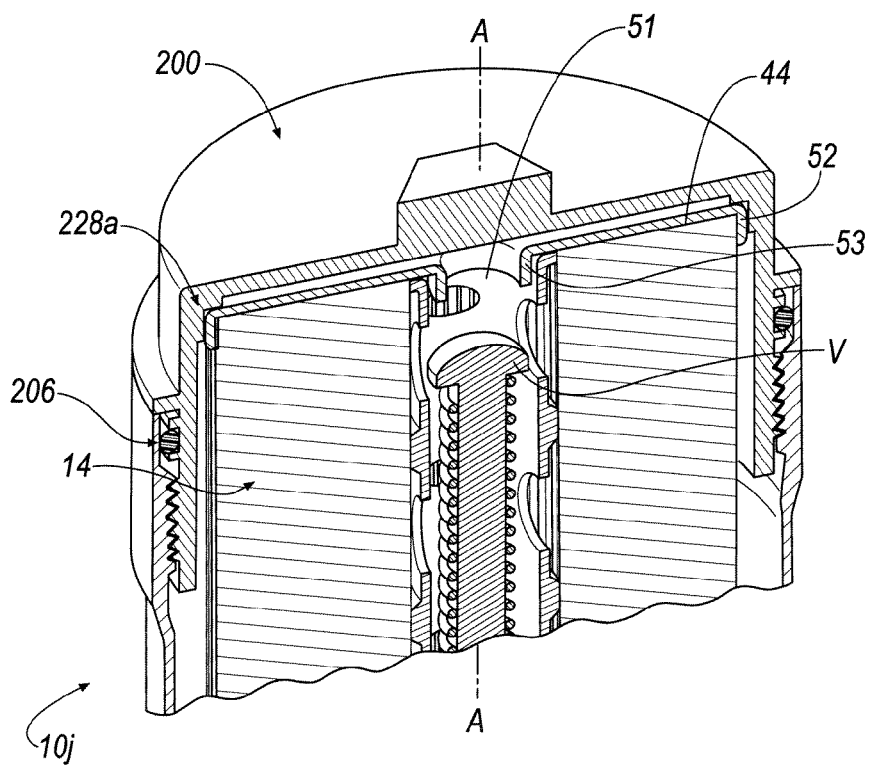
FIG. 14B illustrates an assembled, cross-sectional view of the filter assembly of FIG. 10 including the close-out member of FIG. 11C in accordance with an exemplary embodiment of the invention.

In an embodiment, the outer circumferential surface 206 may include a circumferential base lip 220 that extends radially outward from the outer circumferential surface 206 and is formatted to axially contact the open end 24 of the container 10j (directly or having a seal disposed therebetween) once the close-out member 200 has been secured (e.g., threaded) onto the container 10j (see, e.g., FIGS. 14A and 14B). Further, as seen in FIG. 10, in an embodiment, the outer circumferential surface 206 may include one or more circumferential seal-supporting lips 222 that axially supports/retains a seal ring 224; upon removably-securing the close-out member 200 to the container 10j proximate the open end 24, the sealing ring 206 prevents fluid from escaping the filter assembly 100j between the outer circumferential surface 206 of the close-out member 200 and the inner surface 26 of the container 10j.

Further, in an embodiment, as seen in FIG. 10, the outer circumferential surface 206 may include a threaded portion 226 that interfaces with the inner surface 26 of the container 10j for removably-securing the close-out member 200 to the container 10j. In an embodiment, the inner surface 26 of the container 10j includes a threaded portion 30 that interfaces with the threaded portion 226 of the close-out member 200.

Referring to FIGS. 11A-11C, in an embodiment, one or more of the inner circumferential surface 210 and inner end wall surface 212 of the close-out member 200 defines one or more filter-retaining elements 228a (see, e.g., FIGS. 11A and 11B), 228b (see, e.g., FIG. 11C) that are located proximate the end wall 204. In an embodiment, the one or more filter-retaining elements 228a, 228b extend radially inwardly from the inner circumferential surface 210 and/or axially away from the inner end wall surface 212. In an embodiment, the one or more filter-retaining elements 228a, 228b is/are generally arranged in a ring pattern.

In an embodiment, as seen in FIG. 11A, the one or more filter-retaining elements 228a generally define a ring 230. In an embodiment, the ring 230 defines an interruption/gap 232; although an interruption/gap 232 is shown, in an embodiment, it will be appreciated that an interruption/gap 232 may not be included and that the ring 230 may generally define a continuous loop without an interruption/gap.

In an embodiment, as seen in FIG. 11B, the one or more filter-retaining elements 228a includes a plurality of ring segments 234. In an embodiment, the plurality of ring segments 234 include a plurality of interruptions/gaps 236 therebetween.

In an embodiment, the plurality of ring segments 234 may be spaced equidistantly. However, it will be appreciated upon considering the present disclosure that the number and spacing of the plurality of ring segments 234 is not limited to the above-described embodiment and that any desirable number or spacing of ring segments 234 may be provided, as desired.

Figure 12A:
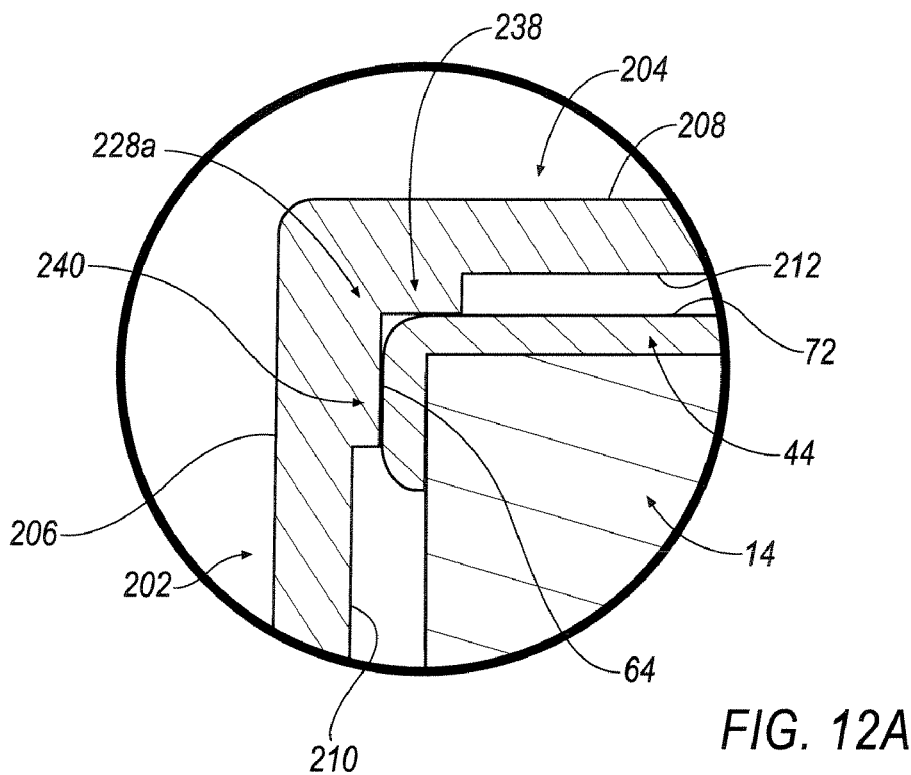
FIG. 12A illustrates an enlarged view of FIG. 11A or 11B according to line 12A of FIG. 11A or 11B in accordance with an exemplary embodiment of the invention.

In an embodiment, as seen in FIG. 12A, the one or more filter-retaining elements 228a may include an axial portion 238 extending axially away from the inner end wall surface 212 and a radial portion 240 extending radially inwardly from the inner circumferential surface 210. In an embodiment, upon removably-securing the close-out member 200 to the container 10j, the axial portion 238 may engage the outer surface 72 of the upper end cap 44 of the filter 14 to prevent axial movement or displacement of the filter 14 within the container 10j. In an embodiment, upon removably-securing the close-out member 200 to the container 10j, the radial portion 240 may engage the side or circumferential perimeter 64 of the upper end cap 44 to prevent radial movement or displacement of the filter 14 within the container 10j.

Figure 12B:
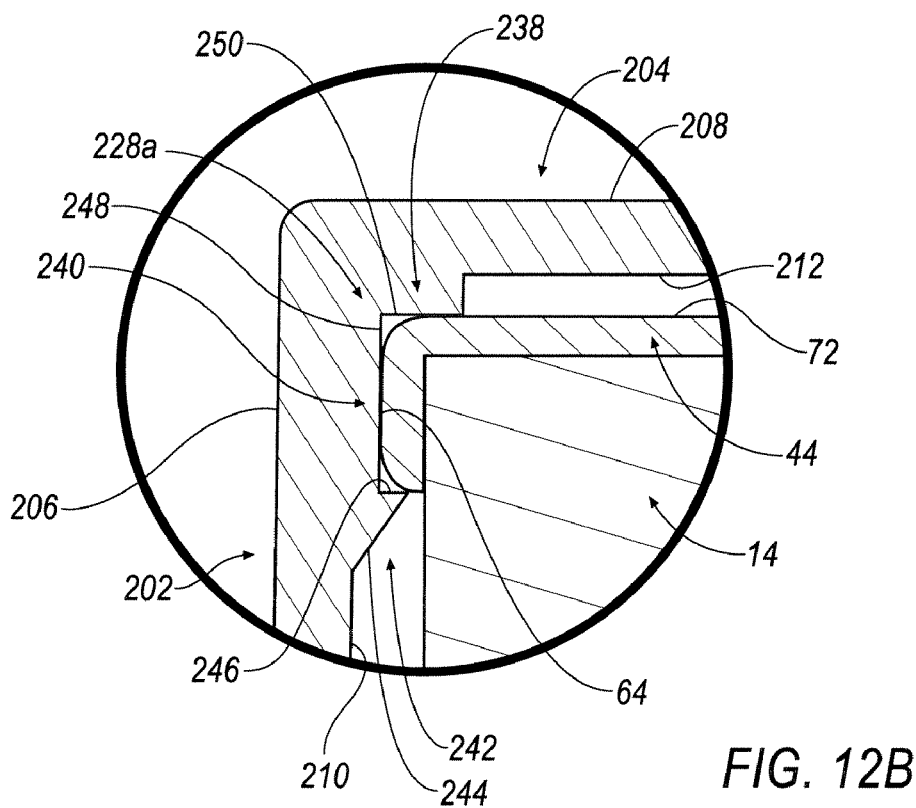
FIG. 12B illustrates an enlarged view of FIG. 11C according to line 12B of FIG. 11C in accordance with an exemplary embodiment of the invention.

Referring now to FIGS. 11C and 12B, the one or more filter-retaining elements 228b may include the axial portion 238, radial portion 240 and an end cap securing portion, which is shown generally at 242, that extends from one or more of the radial portion 240 and inner circumferential surface 210. In an embodiment, the end cap securing portion 242 may include a ramp surface 244 extending diagonally (i.e., radially and axially) from the inner circumferential surface 210, a ledge surface 246 extending radially from the ramp surface 244, a wall surface 248 extending axially extending from the ledge surface 246, and an end surface 250 extending radially from the wall surface 248.

With reference now to FIGS. 14A and 14B, end cap 44 of filter 14 may be annular and define an aperture 51 at a central portion thereof. In an embodiment, the perimeter surrounding aperture 51 may define a lip 53 that depends axially from endcap 46 towards the opposite endcap (not shown). In an embodiment and as depicted in FIG. 14A, the lip (53) may be provided to seat against a valve V. In an embodiment, valve V may be a bypass valve such that when the pressure within an interior portion of filter 14 meets or exceeds a pre-defined threshold, valve V is moved into an open position (as depicted in FIG. 14B) such that the fluid within an interior portion of filter 14 may pass to an outer portion without passing through the media.

Figure 13A:
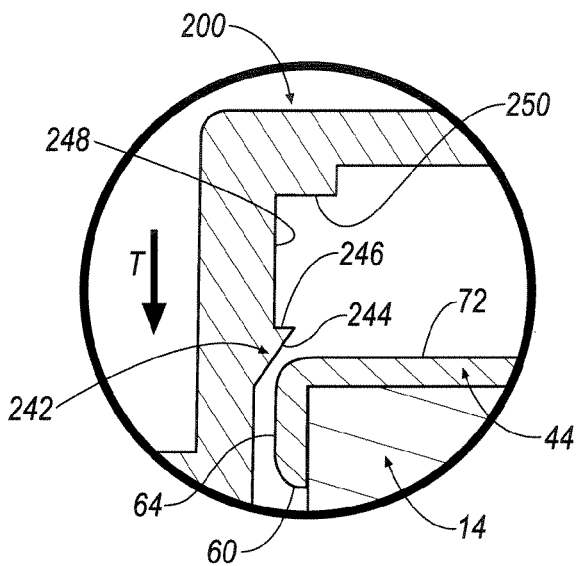
FIGS. 13A-13C illustrate a method for assembling a subassembly for the filter assembly of FIG. 10 in accordance with an exemplary embodiment of the invention.
Figure 13B:
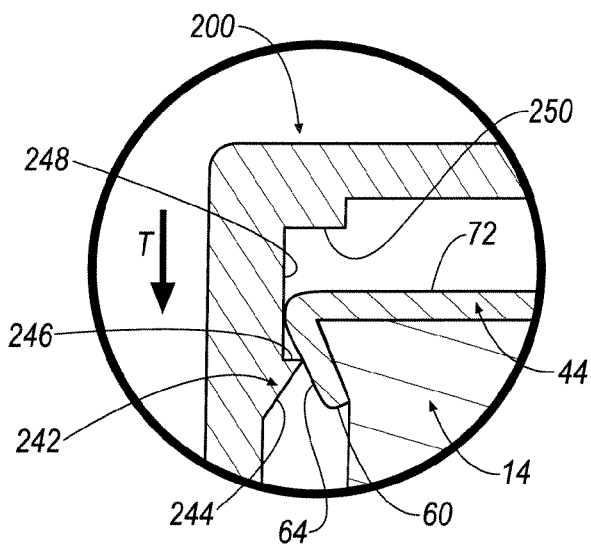
Figure 13C:
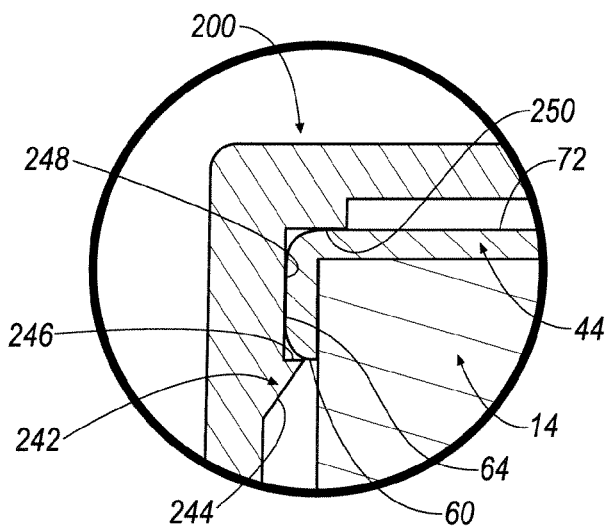

As seen in FIGS. 13A-13C, in an embodiment, as the close-out member 200 is threaded onto the container 10j according to the direction of arrow, T, one or more of the outer surface 72 and the circumferential perimeter 64 of the upper end cap 44 engages the ramp surface 244, thereby elastically-deforming one or more of end cap securing portion 242 and upper end cap 44 as seen, for example, in FIG. 13B. Upon locating the upper end cap 44 in a secured/seated position with the close-out member 200, as shown, for example, in FIGS. 13C and 14B, an audible "snap" may be heard, thereby providing an audible alert that one or more of end cap securing portion 242 and upper end cap 44 has been elastically deformed to its original, at-rest position (see, e.g., FIG. 13A) in order to notify a user/operator that the filter 14 has been locked into place with the close-out member 200.

Once the end cap 44 is secured to the close-out member 200 as shown, for example, in FIGS. 13C and 14B, a circumferential end 60 of the end cap 44 is disposed adjacent the ledge surface 246. Further, in an embodiment, once the end cap 44 is secured to the close-out member 200, the circumferential perimeter 64 of the end cap 44 may be disposed adjacent the wall surface 248. Further, in an embodiment, once the end cap 44 is secured to the close-out member 200, the outer surface 72 of the end cap 44 may be disposed adjacent the end surface 250.

Accordingly, it will be appreciated that if the close-out member 200 includes the one or more filter-retaining elements 228b, upon un-threading/removing the close-out member 200 from the container 10j, the filter 14 will be also be removed from the container 10j in conjunction with the removal of the close-out member 200. Conversely, if, for example, the close-out member 200 includes the one or more filter-retaining elements 228a that does not include the one or more filter-retaining elements 228b, upon un-threading/removing the close-out member 200 from the container 10j, the filter 14 will not be removed from the container 10j in conjunction with the removal of the close-out member 200.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A filter assembly for use in combination with a filter housing having a bypass valve located within the filter housing, said filter assembly comprising:
   a filter including a filter media and first and second end caps located on opposite ends of the filter media, wherein one of said first and second end caps define a central aperture surrounded by a valve sealing lip axially depending from a surface of said one of said first and second end caps toward the other one of said first and second end caps, and wherein said valve sealing lip provides a sealing surface against the bypass valve when the filter is installed within the housing; and
   a close-out member removably secured to the filter container proximate the open end, wherein the close-out member includes a circumferential wall, an end wall, an inner surface, and an outer surface, wherein the inner surface of the close-out member includes one or more filter-retaining elements that engages the end cap, wherein the one or more filter retaining elements are located proximate one or more of the circumferential wall and the end wall, wherein the one or more filter retaining elements include a radial portion extending radially inwardly from an inner circumferential surface of the circumferential wall, and an axial portion extending axially away from an inner end wall surface of the end wall, wherein the one or more filter retaining elements, when viewed in cross-section, includes
      a C-shaped end cap securing portion that extends from one or more of the radial portion and the inner circumferential surface, wherein the C-shaped end cap securing portion includes
         a ramp surface extending diagonally from the inner circumferential surface,
         a ledge surface extending radially from the ramp surface,
         a wall surface extending axially from the ledge surface, and
         an end surface extending radially from the ledge surface.

2. The filter assembly according to claim 1, wherein the inner circumferential surface of the close-out member includes a first threaded surface, wherein the wall surface of the filter container includes a second threaded surface that engages the first threaded surface of the close-out member.

3. The filter assembly according to claim 1, wherein the one or more filter retaining elements includes one or more segments arranged in a ring pattern.

4. The filter assembly according to claim 3, wherein the one or more segments defines one or more interruptions or gaps.

5. The filter assembly according to claim 1, wherein the axial portion includes means for preventing axial movement or displacement of the filter within the filter container.

6. The filter assembly according to claim 1, wherein the radial portion defines means for preventing radial movement or displacement of the filter within the filter container.

7. The filter assembly according to claim 1, wherein the end cap includes an outer surface, a circumferential end, and a circumferential perimeter, wherein one or more of the outer surface and the circumferential perimeter engages the ramp surface upon removably-connecting the close-out member to the filter container to define means for elastically-deforming one or more of C-shaped end cap securing portion and end cap.

8. The filter assembly according to claim 1, wherein the C-shaped end cap securing portion defines means for securing the end cap to the close-out member for conjunctively removing the filter and the close-out member from the filter container.

9. The filter assembly according to claim 7, wherein the circumferential end of the end cap is disposed adjacent the ledge surface, wherein the circumferential perimeter of the end cap is disposed adjacent the wall surface, wherein the outer surface of the end cap is disposed adjacent the end surface.

10. A filter assembly for attachment to a housing having a bypass valve disposed therewithin wherein the valve is movable between a closed position an open position, the filter assembly comprising:
   a close-out member removably securable to the housing, wherein the close-out member includes a circumferential wall, an end wall, an inner surface, and an outer surface, wherein the inner surface of the close-out member includes one or more filter-retaining elements that engage the end cap and are located proximate to one or both of the circumferential wall and the end wall, wherein the one or more filter retaining elements include a radial portion extending radially inwardly from an inner circumferential surface of the circumferential wall, and an axial portion extending axially away from an inner end wall surface of the end wall; and
   a filter element having first and second end caps and filter media disposed therebetween, wherein one of said first and second end caps includes an annular portion that defines an inner diameter surrounding a central aperture, and wherein an annular sealing lip extends axially from said inner diameter towards the other one of said first and second end caps and forms a removable seal against the bypass valve when the filter element is installed in the housing, wherein the one or more filter retaining elements, when viewed in cross-section, includes
      a C-shaped end cap securing portion that extends from one or more of the radial portion and the inner circumferential surface, wherein the C-shaped end cap securing portion includes a ramp surface extending diagonally from the inner circumferential surface, a ledge surface extending radially from the ramp surface, a wall surface extending axially from the ledge surface, and an end surface extending radially from the ledge surface.

11. The component of a filter assembly according to claim 10, wherein the one or more filter retaining elements includes one or more segments arranged in a ring pattern.

12. The component of a filter assembly according to claim 11, wherein the one or more segments defines one or more interruptions or gaps.

13. A sub-assembly of a filter assembly comprising:

a filter including a filter media, and an end cap;

a close-out member engaging the end cap, wherein the close-out member includes a circumferential wall, an end wall, an inner surface, and an outer surface, wherein the inner surface of the close-out member includes one or more filter-retaining elements that engages the end cap, wherein the one or more filter retaining elements are located proximate one or more of the circumferential wall and the end wall, wherein the one or more filter retaining elements include a radial portion extending radially inwardly from an inner circumferential surface of the circumferential wall, and an axial portion extending axially away from an inner end wall surface of the end wall, wherein the one or more filter retaining elements, when viewed in cross-section, includes a C-shaped end cap securing portion that extends from one or more of the radial portion and the inner circumferential surface, wherein the C-shaped end cap securing portion includes means for securing the end cap to the close-out member provided by a ramp surface extending diagonally from the inner circumferential surface, a ledge surface extending radially from the ramp surface, a wall surface extending axially from the ledge surface, and an end surface extending radially from the ledge surface.

14. The filter assembly according to claim 13, wherein the end cap includes an outer surface, a circumferential end, and a circumferential perimeter, wherein the circumferential end of the end cap is disposed adjacent the ledge surface, wherein the circumferential perimeter of the end cap is disposed adjacent the wall surface, wherein the outer surface of the end cap is disposed adjacent the end surface.

* * * * *